United States Patent [19]
Ablowitz et al.

[11] Patent Number: 6,049,608
[45] Date of Patent: Apr. 11, 2000

[54] VARIABLE LENGTH NONLINEAR FEEDBACK SHIFT REGISTERS WITH DYNAMICALLY ALLOCATED TAPS

[75] Inventors: Mark Jay Ablowitz, Boulder, Colo.; James Matthew Keiser, Laurel, Md.

[73] Assignee: University Technology Corporation, Boulder, Colo.

[21] Appl. No.: 08/775,259

[22] Filed: Dec. 31, 1996

[51] Int. Cl.[7] ............................... H04K 1/00; H04L 9/00
[52] U.S. Cl. ............................... 380/28; 380/29; 380/46; 380/265
[58] Field of Search ............................... 380/28, 29, 46, 380/56

[56] References Cited

U.S. PATENT DOCUMENTS

| | | | |
|---|---|---|---|
| 3,911,330 | 10/1975 | Fletcher et al. | 328/37 |
| 5,048,086 | 9/1991 | Bianco et al. | 380/28 |
| 5,054,067 | 10/1991 | Moroney et al. | 380/37 |
| 5,365,588 | 11/1994 | Bianco et al. | 380/42 |
| 5,365,589 | 11/1994 | Gutowitz | 380/43 |

OTHER PUBLICATIONS

Lidl et al., *Introduction to finite fields and their applications*, Cambridge University Press 1994, pp. 189–196.

Physical Review A, vol. 44, No. 10, Nov. 15, 1991, "Class of stable multistate time–reversible cellular automata with rich particle content" by Mark J. Ablowitz, James M. Keiser, and Leon A. Takhtajan.

Applied Cryptography, Second Edition (1996) by Bruce Schneier, Chapter 16, pp. 369–388 and 412–413 "Pseudo-Random–Sequence Generators and Stream Ciphers".

*Primary Examiner*—Pinchus M. Laufer
*Assistant Examiner*—Hrayr A. Sayadian
*Attorney, Agent, or Firm*—Lee & Fishman; Daniel N. Fishman

[57] ABSTRACT

A new class of variable length, nonlinear feedback shift registers (NLFSR's) is disclosed that uses data-dependent dynamically allocated taps to filter digital information reversibly, flexibly, and rapidly. This class of NLFSR's has been succinctly realized in terms of a multi-parameter family of nonlinear, discrete difference equations that operate on digital data of variable length. Each individual NLFSR is characterized by a collection of integer 'parameter functions' and 'boundary condition functions' denoted $\Pi_T$ for an integer $T \geq 1$. A concrete description of an exemplary set $\Pi_T$ is given in the text. Given an input sequence to the NLFSR, the final output sequence is another sequence defined by the values of the parameter and boundary condition functions, and a new reversible (or invertible) non-linear mathematical rule that transforms a sequence of integers into a different sequence of integers. The wide variability in the sets of parameter and boundary condition functions that describe and specify this family of reversible NLFSR's allows for a user-defined, applications-specific flexibility in the level of complexity in the output sequence. This process can be applied, for the purposes of encryption and decryption, to any form of digital information, including but not limited to, audio and video telecommunications and data storage.

23 Claims, 7 Drawing Sheets

FIG. 6
ENCRYPTION
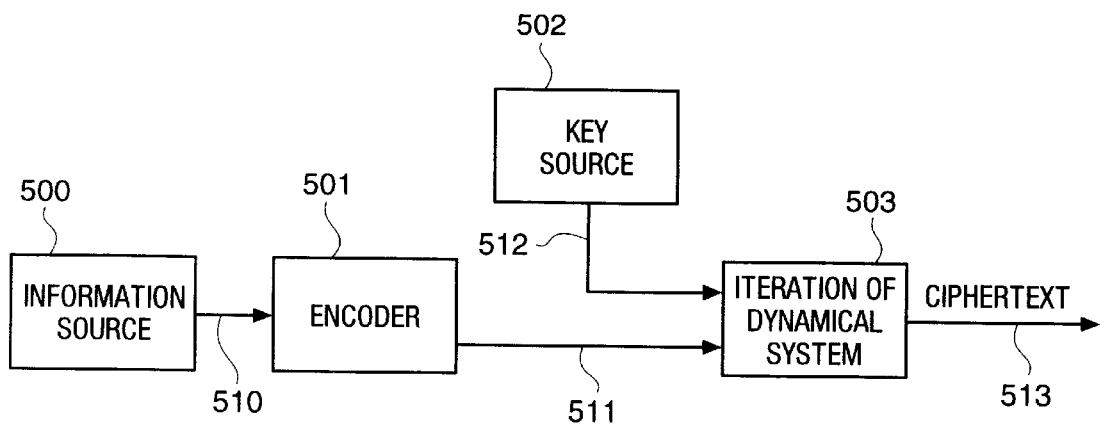
DECRYPTION
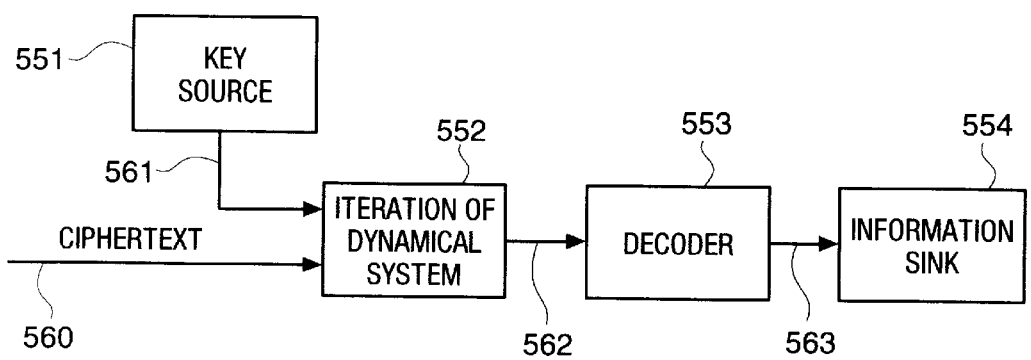

VARIABLE LENGTH NONLINEAR FEEDBACK SHIFT REGISTERS WITH DYNAMICALLY ALLOCATED TAPS

This invention was made possible, in part, with research support under grant F49620-94-0120 from the United States Air Force Office of Scientific Research. The United States Government has certain rights in this invention.

BACKGROUND OF THE INVENTION

1. Field of the Invention

The present invention relates to a new class of reversible nonlinear feedback shift registers (also referred to herein as NLFSR's), and more particularly, to the generalization of suitable NLFSR's in terms of a multi-parameter family of nonlinear discrete dynamical systems. One useful application of this invention is to the encryption and decryption of digital information reversibly, flexibly, and rapidly.

2. Description of the Prior Art

It is known to encrypt information to secure the information from unintended use by unauthorized persons or devices. In general such data encryption uses a key value in conjunction with pseudo-random processing techniques to transform the information. The unencrypted information comprises a string of symbols which are collectively referred to as plaintext. Encoding/encrypting the plaintext string using the key value produces a ciphertext string. Reversing the process of the encryption, i.e., decryption, requires use of the same key value.

FIG. 2 is a block diagram depicting the general flow of information in a system which encrypts information. A transmitting element 1000 in which is embodied an encryption algorithm received a plaintext string 1004 and a key 1006 as inputs. The encryption algorithm in transmitting element 1000 is applied to the plaintext string 1004 under control as defined by the key 1006. The resulting ciphertext string 1003 is then (eventually) applied to a receiving element 1001 in which is embodied a decryption algorithm. The decryption algorithm within receiving element 1001 receives the ciphertext string 1003 and the key 1007 as inputs and produces the plaintext string 1005 as output.

If the keys 1006 and 1007 are the same, the decryption algorithm in receiving element 1001 reverses the processing performed by the encryption algorithm in transmitting element 1000. In such a case, the plaintext string 1005 produced by the receiving element 1001 matches the plaintext string 1004 provided as input to the encryption algorithm in transmitting element 1000. If the keys 1006 and 1007 do not match, the plaintext string 1005 will not match the original plaintext string 1004. The ciphertext string 1003 is thereby secured from unintended use by persons or devices which are not in possession of the proper key (1006 and 1007).

The system of FIG. 2 is exemplary of several applications of encryption/decryption processes. For example, elements 1000 and 1001 may be processes within a general purpose computer for storing an encrypted ciphertext string in a mass storage file then later retrieving it and decrypting the stored information. Or, for example, elements 1000 and 1001 may be communicating devices, such radio or telephonic voice communication devices, or data communication devices (modems), or facsimile devices, etc. FIG. 2 is therefore intended to represent any system which utilizes encryption and/or decryption of information.

The process of attempting to derive the plaintext which corresponds to a ciphertext without access to the key is often referred to as cryptanalysis or a cryptanalytic attack. Prior art techniques for encryption suffer a variety of problems, including the fact that many fall victim to cryptanalytic techniques which can derive the plaintext from the cyphertext. Such prior techniques are therefore insecure for encryption of highly sensitive information.

Prior techniques for encryption tend to balance level of security against computational complexity. Some prior techniques offer significant security against cryptanalytic techniques but at a significant cost in complexity of computation. Other prior methods offer simpler computation but at a cost of lessened security against cryptanalytic attack.

One prior technique for encryption uses feedback shift registers to encrypt/decrypt information. The theoretical considerations and practical implementations of feedback shift registers (FSR's) are well-known as presented, for example, in U.S. Pat. No. 5,365,589, issued to Gutowitz on Nov. 15, 1994 and in *Applied Cryptography*, $2^{nd}$ Ed. John Wiley and Sons, Inc. by B. Schneier (1996).

An FSR generally consists of two parts as shown in FIG. 1: an n bit shift register 901 comprising n bits 902 ($B_1 \ldots B_n$), and a feedback function 905. Each bit 902 of shift register 901 may be applied to feedback function 905 via path 904 in accordance with the tap sequence defined for the FSR. Certain combinations of the values of each bit are used as inputs to the feedback function, and each bit computed by the feedback function 905, is fed back into the first bit in the shift register 901 via path 903. The clocked output of the shift register 901 is applied to path 900 for use in producing the ciphertext string from the plaintext string. The sequence of bits thereby produced can represent a pseudo-random sequence which is used by encryption algorithms to produce a ciphertext string from an input plaintext string. The process can be reversed to generate the original plaintext string from a ciphertext string.

If the feedback function is the XOR logical function, (or the sum 'modulo 2'), of certain bits in the shift register then the FSR is called a linear feedback shift register (LFSR). Associated with each bit in the shift register is a weight that defines how much the corresponding bit contributes to the feedback function. A list of these weights is called the tap sequence of the LFSR.

A binary n bit LFSR is one in which each element of the shift register takes on one of two values, e.g., 0 or 1. Such a binary LFSR can be in one of $2^n-1$ nontrivial states. It is well known that only certain tap sequences will cause an LFSR to cycle through all of these $2^n-1$ states in a complex, pseudo-random fashion. In order for an LFSR to cycle through this maximum number of states, the polynomial formed from the tap sequence plus the integer 1 must be a primitive polynomial 'modulo 2.'

There are three immediate difficulties with using an LFSR to generate complex output sequences. First, there is no simple way to generate primitive polynomials 'mod 2' other than by choosing a random polynomial and testing if it is primitive. Second, in order to generate suitably complex output sequences the LFSR should have a large number of non-zero taps. However, it is, in general, difficult to generate primitive polynomials with a large number of non-zero taps. Finally, an LFSR can be completely characterized using 2n bits of an output sequence via the Berlekamp-Massey algorithm (see Schneier, supra.). In general, it is difficult to use an LFSR to combine elements of an input sequence in a suitably complex fashion. See Schneier (supra.) and references therein for a discussion of LFSR's and their properties.

It is apparent from the above discussion that improved encryption/decryption techniques are desired which provide both improved security against cryptanalytic attack and simplified computation.

SUMMARY OF THE INVENTION

The present invention solves the above and other problems, thereby advancing the state of the useful arts, by providing methods and associated apparatus for manipulation of a new class of variable length, nonlinear feedback shift registers (NLFSR's) that uses data-dependent, dynamically allocated, taps to filter digital information reversibly, flexibly, and rapidly. Each individual NLFSR of this class of NLFSR's is characterized by a collection of integer 'parameter functions' and 'boundary condition functions.' Given an input sequence to the NLFSR, the final output sequence is another sequence defined by the values of the parameters, the boundary conditions, and a new reversible (or invertible) nonlinear mathematical rule that transforms a sequence of integers into a different sequence of integers.

One useful application of the methods of the present invention is in the field of data encryption and decryption to provide fast, yet secure, encryption of data. Such data encryption may be used in data storage and retrieval systems as well as data communication systems to secure sensitive data from unintended access.

This class of NLFSRs has been succinctly realized in terms of a multi-parameter family of reversible nonlinear, discrete difference equations that operate on digital data of variable length. The difference equations operate on a local subset of the digital data in such a manner that, in one embodiment of this invention, the implementation in terms of cellular automata may be used for fast operation in (serial or parallel) hardware realizations of the algorithm. The wide variability in the sets of parameter and boundary condition functions that describe and specify the NLFSR's allows for a user-defined, applications-specific flexibility in the level of complexity in the output sequence. This process can be applied to any form of digital information, including but not limited to audio and video telecommunications and data storage.

A single NLFSR of this family of NLFSR's transforms an input sequence into an output sequence. This transformation can be expressed in terms of a functional relationship of the form $$Y = \Im(X; \Pi_T), \quad (1)$$

where X and Y represent the input and output sequences, respectively, the NLFSR is identified by the symbol $\Im$, and, $\Pi_T$ is a collection of integer parameter and boundary condition functions.

The herein disclosed family of NLFSR's is reversible such that there is an inverse NLFSR $\Im^{-1}$ corresponding to the NLFSR $\Im$ of Equation 1 that satisfies $$X = \Im^{-1}(Y; \Pi_T), \quad (2)$$

or, equivalently, $$X = \Im^{-1}(\Im(X; \Pi_T); \Pi_T) = \Im(\Im^{-1}(X; \Pi_T); \Pi_T), \quad (3)$$

for any sequence X and collection $\Pi_T$.

In the preferred embodiment, below, the present invention specifies the structure and content of the collection of parameters $\Pi_T$, and one such pair of multi-parameter family of nonlinear discrete dynamical system $\Im$ and $\Im^{-1}$.

Fixed and Variable Length Block Ciphers

One of the significant advantages of this invention over most other encryption algorithms is the ability of the present algorithm to operate on variable length data. Many other algorithms, most notably block ciphers, operate on data that is "quantized" into blocks of fixed length. The length of these blocks usually depends on the algorithm and not on the data. For example, the Data Encryption Standard (DES) operates on blocks that are 64-bits long. Although alternate realizations of the DES use blocks of other lengths, the block length remains fixed. In order to clarify this difference with the prior art, fixed length and variable length block ciphers are now described. The DES encryption techniques are well known in the art as documented in Schneier (supra.)

A fixed length block cipher that operates on L bits (e.g. L=64, 128, etc.) must necessarily quantize the input data into multiples of L bits. If the length of an input message is M bits and the length does not happen to be a multiple of L (the fixed quantum block size), then the "usual" means of handling the remaining bits of data is by padding with zeros. It is known, that such padding may allow for a cryptanalytic attack on the key, if one of these padded blocks is intercepted.

One embodiment of the present invention operates on data of a variable length by projecting the input data onto a lattice (e.g., in a computer program a 'lattice' may be considered a vector). This lattice may be considered to be infinitely long to receive the data (plaintext) in its entirety. The methods of the present invention then operate on the input data in a local neighborhood of the data. From a mathematical perspective this embodiment computes the encrypted message using an infinite-length interval algorithm (ILI-algorithm).

In an ILI-algorithm, each plaintext character is first transformed into an sequence of L symbols. Each of these symbols is taken from a finite set of k-symbols (as discussed below). For example, if k=2, L=7 then the character 'A' may be replaced by 1000001, 'B' by 1000010, etc. in a fashion similar to the standard ASCII character set. The resulting binary representation of the input message is projected into a data processing vector of great length, e.g., $10^6$ elements long. The ILI-algorithm then computes the encrypted message in accordance with the methods of the present invention discussed below. Finally, starting at the first '1' in the data processing vector (first on the left visualizing the vector graphically left to right), the encrypted binary information is re-quantized into L length blocks and the corresponding alphanumeric character is output as the encrypted message. FIG. 4 illustrates this process on the sample input message 'Hi' using k=2 and L=7.

In FIG. 4, a plaintext input message 700 is shown in both ASCII form (the letters 'Hi') and in the equivalent binary form of the 7-bit ASCII representation. This binary plaintext string is then projected onto an infinitely long data processing vector 701 as the initial message to be encrypted by the methods of the present invention. By the processing of the present invention, the initial message 701 is encrypted in place of the data processing vector to form the encrypted message 702. Starting at the first bit (from the left) having a value of 1, the encrypted message is then broken up into 7-bit quantized units and generated as a cyphertext output 703 shown both in binary form and in ASCII as the letters 'V|#'. The process may be operated by processing the ciphertext string from right to left (graphically viewing the vector) and processing the computations in reverse time order.

Though the ILI algorithm as applied to cryptography in the present invention is effective in certain applications, there are significant disadvantages with an infinite-length interval approach. First and foremost is that the encrypted message is in general longer than the original input message. This could, in theory, allow for a cryptanalytic attack on the algorithm. In other words, encrypted messages that are longer than the original message are undesirable. Second, the quantization steps can introduce the need for padding (e.g., with zeros thereby permitting possible cryptanalytic attack). Finally, from a computational point of view, manipulating very large vectors, i.e. the $10^6$ element data processing vector, is cumbersome and inefficient.

The present invention therefore introduces so-called boundary conditions by restricting the infinite-length interval to a finite-length interval (FLI). The FLI-algorithm can operate on data using memory structures, i.e. vectors, that are of variable length, (e.g. as long as the input data), in an entirely data-dependent and variable fashion. The FLI-algorithm first transforms a plaintext message of M alphanumeric input characters into M×L symbols taken from the finite set of k-symbols. Then these M×L symbols are encrypted using the M×L symbols of the data processing vector. The resulting M×L symbols may then be transformed to an alphanumeric representation.

For example as shown in FIG. 5, if k=2, L=7 and the input message 600 is 'Hi Mom', then the binary representation is 6×7 bits long (counting the space between the 'i' and the 'M'). This 42-bit long input message is then operated on by the FLI-algorithm using only 42-bits of memory in the data processing vector 601. The resulting encrypted message 602, which is also 42-bits long, may or may not be re-quantized and transformed into its alpha-numeric representation. If the encrypted message is re-quantized, then 6 alpha-numeric characters are the resulting ciphertext 603—exactly as many as are in the original message.

Advantages of the FLI-algorithm over the ILI-algorithm include:
  There is no spreading of encrypted data. The encrypted message is exactly the same length as the input message.
  The re-quantization step is optional and if used will not introduce arbitrary padding.
  The data processing vector is as long as the longest message one expects to send (this is entirely data dependent). There is no need for allocating and manipulating very long vectors.
  For certain applications, a look-up table may be precomputed for a given key, once the message length has been specified. This can significantly increase the speed and efficiency of the algorithm and allows for a parallel implementation.

Clearly the FLI-algorithm is data-dependent. If the length of the message is changed, then there is no necessary modification of the algorithm, and no padding.

It is therefore an object of this invention to describe a new multi-parameter family of deterministic and reversible (or 'invertible') nonlinear dynamical systems.

It is another object of this invention to describe a new multi-parameter family of nonlinear, discrete difference equations that operate on digital data of variable length.

It is yet another object of this invention to describe a means for filtering digital data using a multi-parameter family of nonlinear, discrete difference equations that are characterized by reversible, nonlinear, discrete dynamical systems.

It is a further object of this invention to describe a deterministic reversible (or invertible) nonlinear dynamical process for the encryption and decryption of any form of digital data in an extremely complex fashion. Such a cryptographic system is characterized by the functions $\Im$ and $\Im^{-1}$, and the collection of parameters $\Pi_T$. One pair of reversible, nonlinear, dynamical systems $\Im$ and $\Im^{-1}$, and the collection of parameters $\Pi_T$ are described in the Preferred Embodiment. A generic data processing and transmission flow involving a cryptographic system is shown schematically in FIG. 2. An input sequence or plaintext, e.g. digital information, and a key are supplied to the encryption process of the cryptographic system that generates an output sequence or ciphertext. The receiver then recovers the input sequence using the same key and the decryption process.

The encryption process of a generic cryptographic system can be viewed as a functional relationship of the form $$C=\Im(P,\Pi_T), \qquad (4)$$

where P and C represent the plaintext and ciphertext, respectively, and correspond to the input and output sequences X and Y appearing in Equations 1 and 2. The encryption process itself, denoted $\Im$ is a function, equation or set of rules that transforms plaintext P into ciphertext C using a set of parameters $\Pi_T$, which corresponds to the key. The decryption process corresponding to Equation 4 is a functional relationship of the form $$P=\Im^{-1}(C,\Pi_T), \qquad (5)$$

where $\Im^{-1}$ is a function, equation or set of rules that transforms ciphertext C into plaintext P using the key $\Pi_T$. The functions $\Im$ and $\Im^{-1}$ can be viewed as inverses of each other. The present invention describes a multi-parameter family of nonlinear transformations that are discrete, reversible (or invertible), and deterministic and correspond to the functions $\Im$ and $\Im^{-1}$ of equations 4 and 5, respectively. Note that in general the function $\Im^{-1}$ can be used in place of the function $\Im$ in Equation 4, with a corresponding use of $\Im$ in Equation 5.

It is another object of this invention to provide a cryptographic system that is fast, using a minimum number of simple mathematical operations in both software and hardware embodiments of the system. The algorithmic complexity of this invention, which is a measure of the time and resources needed to encrypt and decrypt the information, is proportional to the amount of information and the level of complexity the user imposes on the output sequences generated by the system. Fixing the set of parameters $\Pi_T$ the amount of computational time needed to process B bits of information is twice as much as the amount of computational time needed to process B/2 bits of information. Therefore the algorithmic complexity of this invention is 'linear' in the amount of information processed by this invention.

It is another object of this invention to provide a cryptographic system that is efficient. Any implementation of this system does not require large amounts of computer memory or super-computing capabilities. The cryptographic system can be run on conventional personal computers.

It is another object of this invention to provide a cryptographic system that is flexible, in so far as the keys of the system are concerned. The keys of the system consist of the collection of integer parameter and boundary functions $\Pi_T$. Different sets of keys provide different levels of security, giving rise to a user-decidable tradeoff between cost and security. Each of the key elements can be chosen arbitrarily as there is no necessary relationship between the key elements, as for example in the Rivest-Shamir-Adleman (RSA) public key algorithm that requires large relatively prime integers for reliable security, see e.g. U.S. Pat. No. 4,405,829, issued Sep. 20, 1983 to Rivest et al. Therefore, there are effectively an infinite number of arbitrary keys.

It is another object of this invention to provide a cryptographic system that operates on data of fixed or variable length, as compared with many systems that require fixed length blocks of data. Each of the parameters $L_m(t)$, in the set $\Pi_T$ defined below by Equation 9, (for each t=1, 2, . . . , T, and m=1, 2, . . . , M(t)), can be chosen depending on the length of the input sequence, the speed of the data processing elements, the amount of memory available to the data processing elements, etc.

It is another object of this invention to provide a cryptographic system that has exponential dynamic complexity. Dynamic complexity is a measure of the resources needed to exhaustively search for an input sequence given only the output sequence and a description of the cryptographic system, without knowledge of the keys.

It is another object of this invention to provide a cryptographic system that is exact. The nonlinear discrete dynamical systems that describe the encryption and decryption processes are invertible and loss-less, therefore encrypted information is uniquely recovered by the decryption process.

It is another object of this invention to provide a cryptographic system that can be implemented without the use of floating point arithmetic. The nonlinear discrete dynamical systems that describe the encryption and decryption processes operate on input sequences that consist entirely of integers, using integer arithmetic to compute output sequences that consist entirely of integers.

It is another object of this invention to provide a cryptographic system that is simple, in that the cryptographic system can be efficiently implemented in any computer language or through the use of electronic circuits, e.g. computer chips.

It is still a further object of the present invention to provide a class of time reversible discrete dynamic systems defined as NLFSRs for cryptographic applications.

It is then a further object to provide time reversible dynamic systems the parameters of which are used as a cryptographic key for encryption and decryption of digital information.

BRIEF DESCRIPTION OF DRAWINGS

FIG. 6 is a schematic illustration of the main elements in a cryptographic system based on the reversible, nonlinear, discrete, dynamical systems of the present invention;

DETAILED DESCRIPTION OF THE PREFERRED EMBODIMENT

Figure 1:
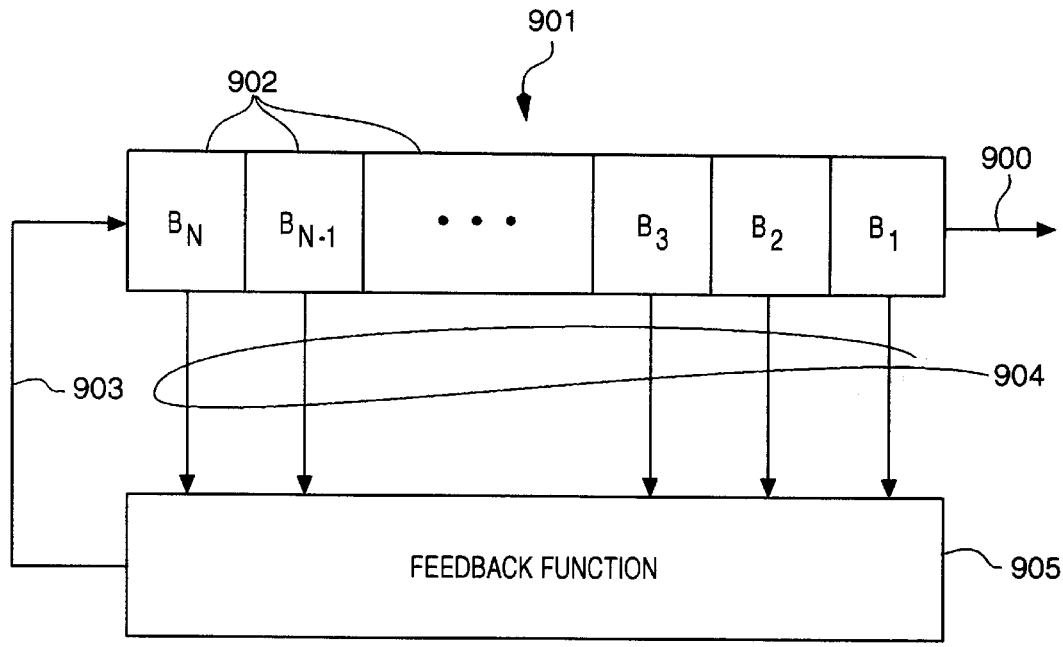
FIG. 1 is a schematic illustration of a typical feedback shift register having a feedback function.
Figure 2:
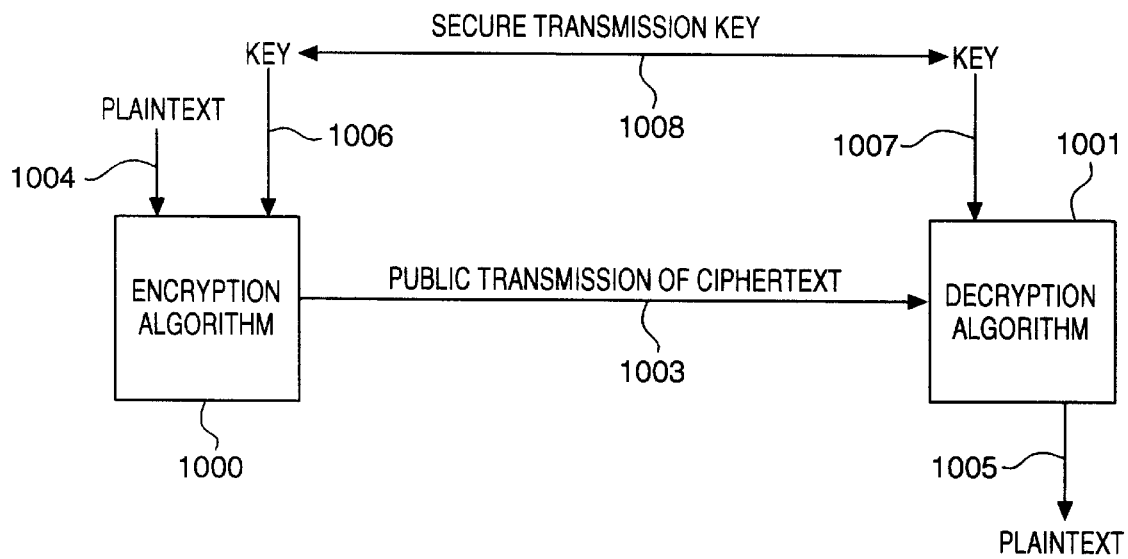
FIG. 2 is a block diagram of a typical data processing and transmission flow for an encryption/decryption system.

The method and apparatus of the preferred embodiment is now described. In particular, this section specifies the structure and content of the collection of parameters $\Pi_T$ and one such multi-parameter family of reversible nonlinear discrete dynamical systems corresponding to $\Im$ and $\Im^{-1}$ appearing in Equations 1 and 2, respectively. Additionally, in this section is also described (as an illustrative example) the details of the method and apparatus used to implement the reversible nonlinear discrete dynamical system as a cryptographic system, i.e. the use of Equations 4 and 5.

Reversible Nonlinear Discrete Dynamical Systems $\Im$ and $\Im^{-1}$

A pair of reversible, nonlinear, discrete dynamical systems, $\Im$ and $\Im^{-1}$, satisfies $$X(t+1)=\Im(X(t);\Pi_T), \tag{6}$$

$$X(t)=\Im^{-1}(X(t+1);\Pi_T), \tag{7}$$

or, equivalently, $$X(t)=\Im^{-1}(\Im(X(t);\Pi_T);\Pi_T)=\Im(\Im^{-1}(X(t+1);\Pi_T);\Pi_T), \tag{8}$$

for each t=1, 2, . . . T(T≧1), and any collection of parameters $\Pi_T$. At each 'time step' t, the sequence X(t) consists of M symbols taken from the set of k(t) elements.

Each element in the sequence X(t) is identified by a 'spatial' index $\vec{i}$, which, in general is a d-vector for a 'sequence' X(t) in a d-dimensional 'space'. For the purposes of the present invention we consider the case d=1, in which case $\vec{i}=i$ is simply a scalar. For each sequence X(t) that consists of M elements the index i=1, 2, . . . , M. Therefore, each element in each sequence is uniquely identified by the 'temporal' index t=1, 2, . . . , T and the 'spatial' index i=1, 2, . . . , M, and is denoted $x_i^t$. Therefore, the entire sequence itself is denoted by $X(t)=[x_i^t]_{i=1}^{i=M}$, and each $x_i^t$ is a member of a finite set of k(t)≧2 elements at time t, i.e. $x_i^t \in \{0, 1, 2, \ldots, k(t)-1\}$.

For each T≧1 the collection of integer parameter and boundary condition functions $\Pi_T$ is denoted by the set of ordered sets (or tuples)

$$\Pi_T=[[L(t),B^l(t),B_r(t),r^l(t),r^r(t),k(t),p(t)]] \; t=1,2,\ldots,T. \tag{9}$$

For example, if T=2 then $$\begin{aligned}\Pi_2 &= [[L(t), B^l(t), B^r(t), r^l(t), r^r(t), k(t), p(t)]] \quad t=1,2 \\ &= [[L(1), B^l(1), B^r(1), r^l(1), r^r(1), k(1), p(1)], \\ &\quad [L(2), B^l(2), B^r(2), r^l(2), r^r(2), k(2), p(2)]]\end{aligned} \tag{10}$$

The symbols $L(t), B^l(t)$, and $B^r(t)$ in Equation 10 represent collections of arbitrary integers that are defined for each t=1, 2, . . . , T by $$L(t)=[L_m(t)]m=1,2,\ldots,M(t), \tag{11}$$

$$B^l(t)=[b_i^l(t)]\; i=1,2,\ldots,r^l(t), \tag{12}$$

$$B^r(t)=[b_i^r(t)]\; i=1,2,\ldots,r^r(t), \tag{13}$$

where the integer functions $L_m(t)$, $b^l_i(t)$, and $b^r_i(t)$ are described below.

The integer functions $r^l(t)$, $r^r(t)$, $k(t)$, and $p(t)$ satisfy, for each t $$r^l(t)\geq 1, \tag{14}$$

$$r^r(t)\geq 1, \tag{15}$$

$$k(t)\geq 2, \tag{16}$$

$$p(t) \in \{-1,1\}. \tag{17}$$

L(t) is, as above, the number of values to be encoded at time t. The integer functions $r^l(t)$ and $r^r(t)$ are called the left and right radii, respectively, and define the size of the neighborhood of interaction in the dynamical systems $\Im$ and $\Im^{-1}$. The integer function k(t) is the cardinality (or number of elements) of the set (or alphabet) used to define each $x_i^t$. The integer function p(t) defines the specific dynamical system to be used. For a larger class of dynamical systems, one could use an expanded set for p(t) such as $$p(t) \in \{-(\rho-1), -(\rho-2), \ldots -1, 1, 2, \ldots (\rho-1)\}. \tag{18}$$

In this discussion we shall restrict the examples to $\rho=2$, and in this case p(t) defines the 'parity' of the system at time t, and specifies whether Equation 6 (where p(t)=+1) or Equation 7 is used (where p(t)=-1).

For each t=1, 2, ..., T, the sequence X(t) may be partitioned into $M(t) \geq 1$ sub-sequences $L_m(t)$, each of length $\geq 1$. The total number of elements used ($\Im$) is therefore $$\mathcal{E} = \sum_{m=1}^{m=M(t)} L_m(t). \tag{19}$$

The integer functions $b_i^l$ and $b_i^r$, in Equations 12 and 13, define 'boundary conditions' (BC's). For clarity we separate the BC's into two collections of symbols. For each t we identify a 'left' BC function, or $r^l(t)$-tuple, denoted $b_i^l(t)$ and defined for i=1, 2, ..., $r^l(t)$. Similarly, there is a 'right' BC function, or $r^r(t)$-tuple, denoted $b_i^r(t)$ and defined for i=1, 2, ..., $r^r(t)$. For each t, the BC's consist of a collection of $$R(t) = r^l(t) + r^r(t), \tag{20}$$

symbols taken from the set of k(t) elements.

Figure 3:
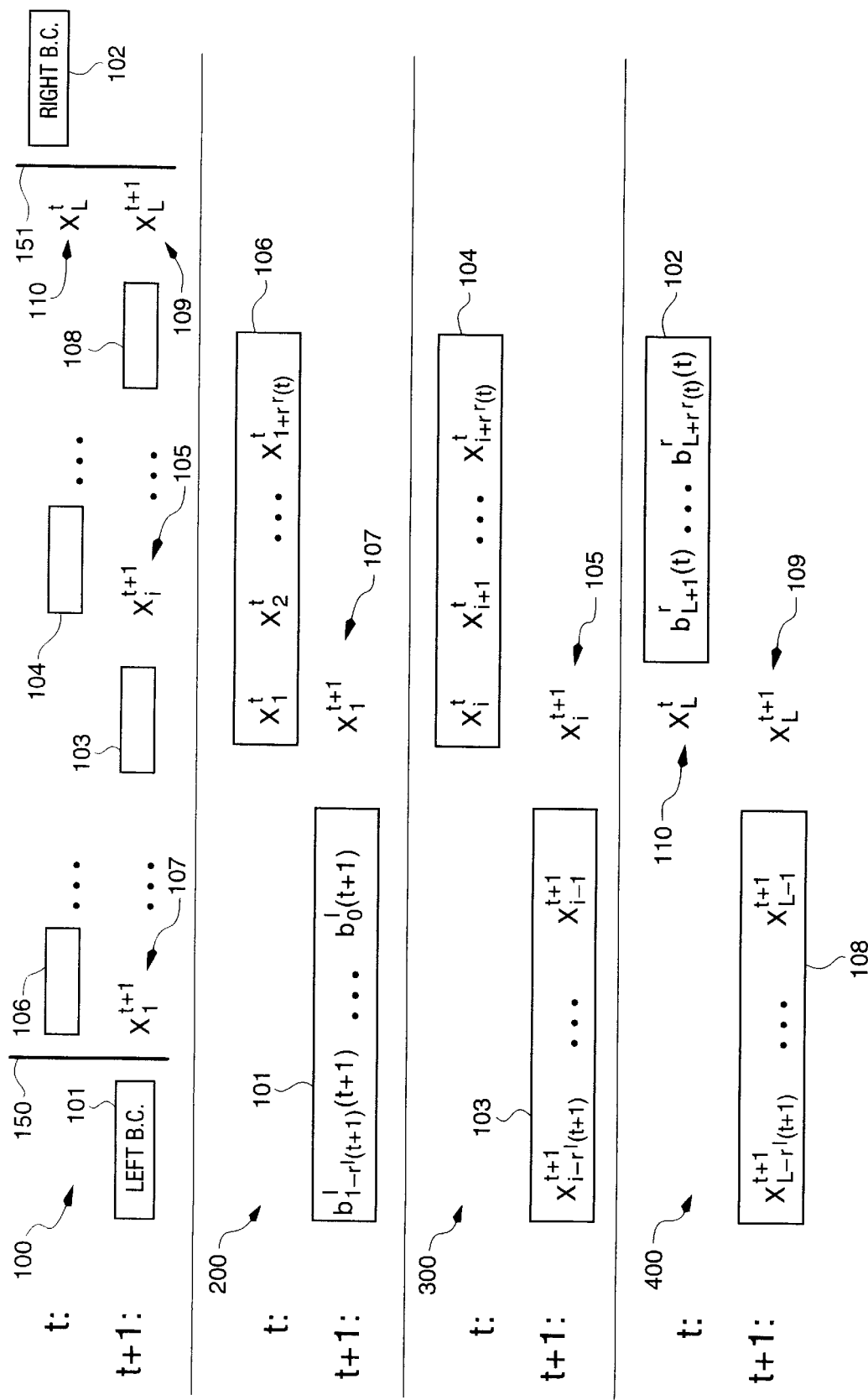
FIG. 3 is a block diagram describing the temporal and spatial relationship of state vectors and boundary conditions associated with the NLFSR methods and apparatus of the present invention.
Figure 4:
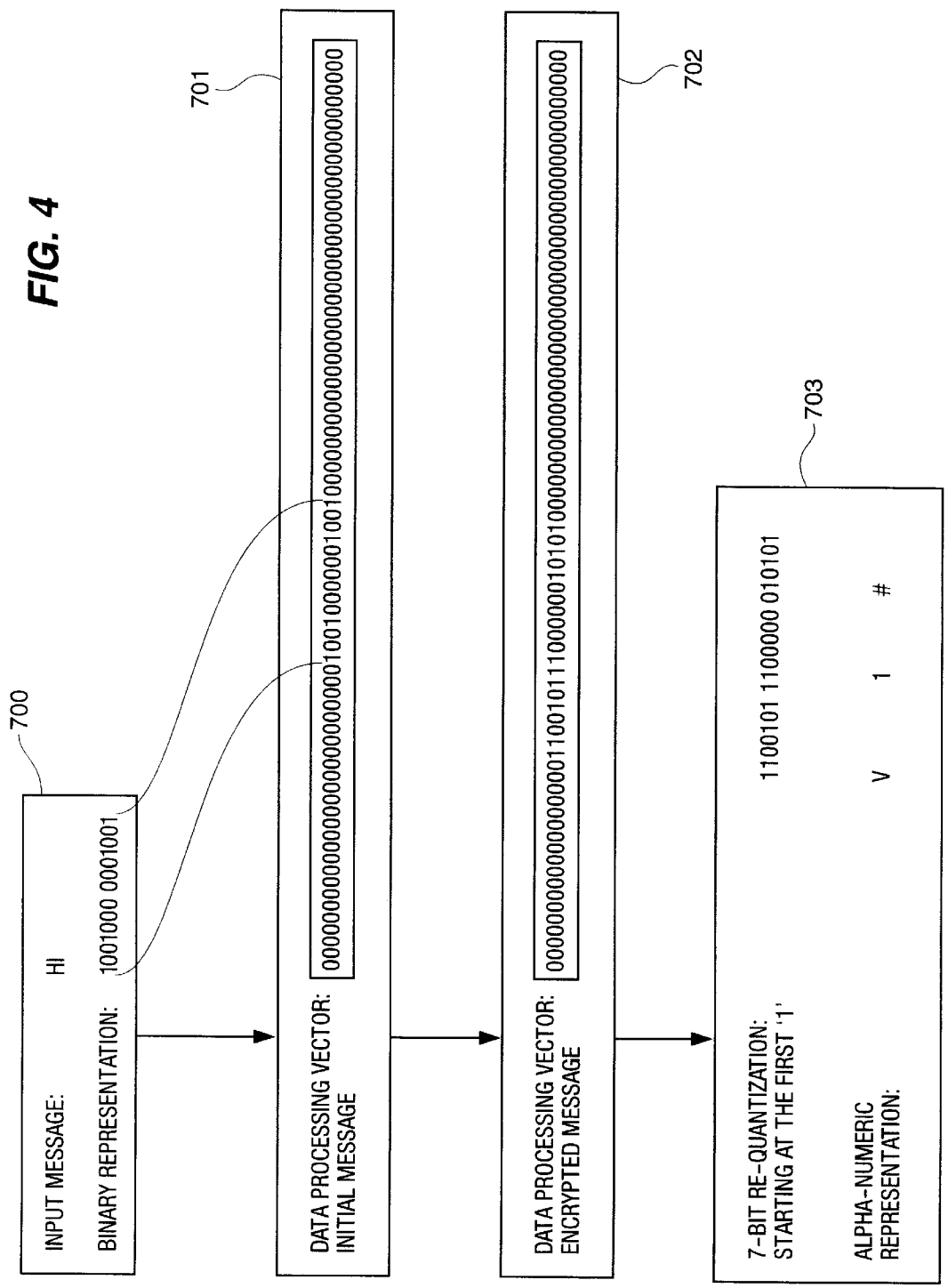
FIG. 4 depicts the flow of data under the ILI methods of the present invention.
Figure 5:
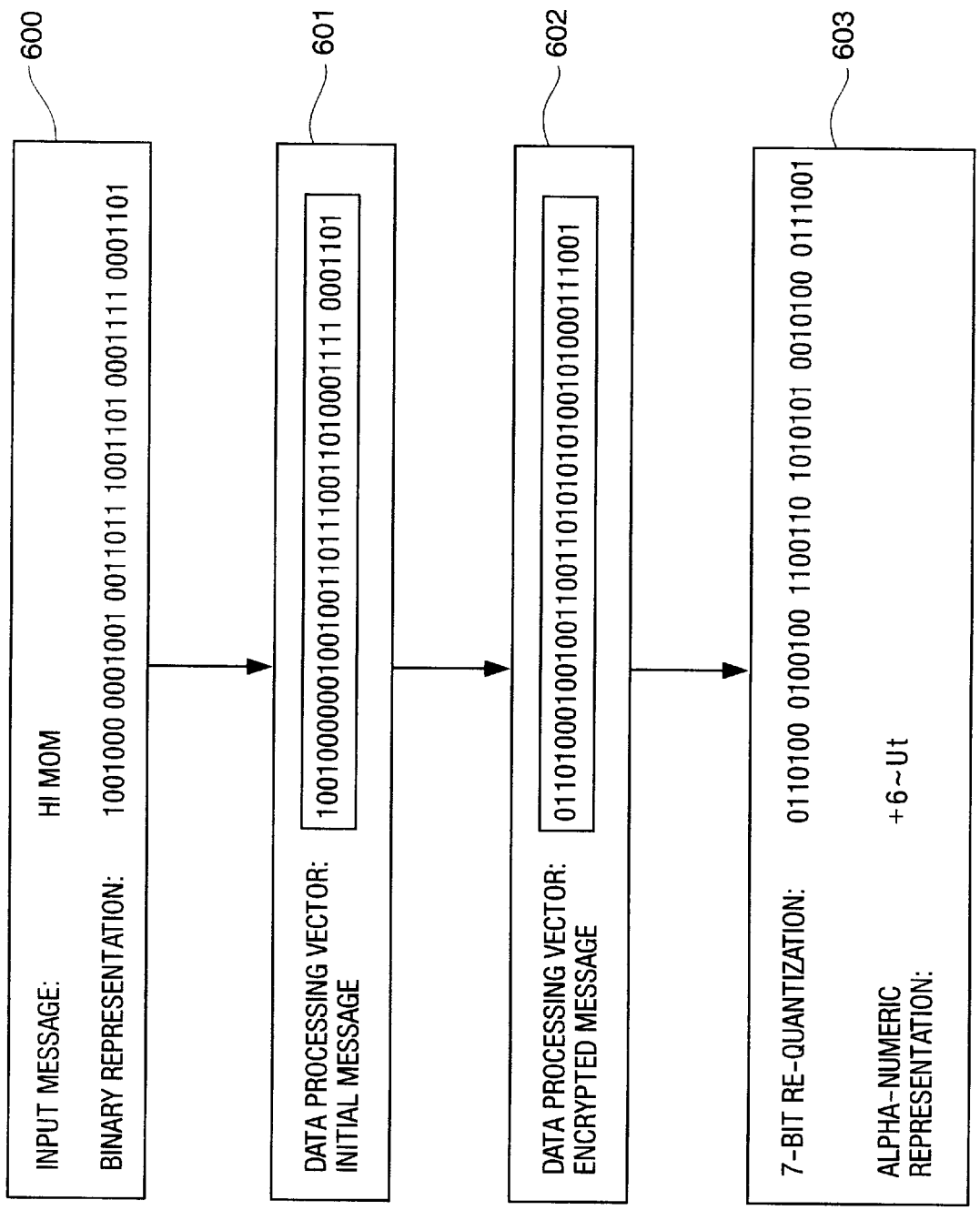
FIG. 5 depicts the flow of data under the FLI methods of the present invention.

FIG. 3 illustrates the temporal and spatial relationships between the parameters appearing in $\Pi_T$. In particular, table 100 of FIG. 3 shows three 'computational regions' associated with the dynamical systems $\Im$ or $\Im^{-1}$: near the left boundary, at an intermediate location, and near the right boundary. Vertical lines 150 and 151 indicate the transitions between boundary data and the state vector at the left boundary and the right boundary, respectively. A top portion of the table 100 (consisting of elements 102, 104, 106, and 110) reflects the state of the dynamical system at time t while the lower portion (elements 101, 103, 105, 107, 108, and 109) reflects the state of the dynamical system at time t+1. The system $\Im$ transforms the dynamical system from the state at time t to t+1 and the inverse system $\Im^{-1}$ transforms the dynamical system from the state at t+1 to t.

The intermediate state vector of the dynamical system at time t+1 consists of the L values $x_1^{t+1} \ldots x_L^{t+1}$ as represented graphically by elements 107, 103, 105, 108, and 109 of the lower portion of table 1. The intermediate state vector of the system at time t similarly consists of the L values $x_1^t \ldots x_L^t$ as graphically represented by elements 106, 104, etc. The right boundary condition values at time t are represented as the $r^r(t)$ values $b_{L+1}^r(t) \ldots b_{L+r^r(t)}^r(t)$ of element 102 while the left boundary condition values at time t+1 are represented as the $r^l(t+1)$ values $b_{1-r^l(t+1)}^l(t+1) \ldots b_0^l(t+1)$ of element 101.

Each value $x_i^{t+1}$ is computed (evolved in the "forward" direction by $\Im$) from the previous (in time) value $x_i^t$, a number of values spatially to the left ($r^l(t)$), and a number of previous (in time) values spatially to the right ($r^r(t+1)$).

Table 300 of FIG. 3 shows the relationship between elements of the dynamical systems $\Im$ and $\Im^{-1}$ and the parameters of $\Pi_T$ at any intermediate spatial location i (sufficiently distant spatially from the left and right boundary conditions). Table 200 of FIG. 3 shows the relationship between elements of the dynamical systems $\Im$ and $\Im^{-1}$ and the parameters of $\Pi_T$ at the 'left' boundary, and table 400 of FIG. 3 shows the relationship between elements of the dynamical systems $\Im$ and $\Im^{-1}$ and the parameters of $\Pi_T$ at the 'right' boundary. At the left and right boundaries, the values to the left and right, respectively, are the boundary condition values 101 and 102, respectively. One of ordinary skill will recognize that computation of a value near, but not at, a boundary will utilize a portion of the values in the corresponding left or right boundary condition 101 and 102, respectively. Tables 200, 300, and 400 of FIG. 3 therefore are intended as exemplary of the computational states encountered in the processing of the dynamical system.

In view of Equations 6 and 7, and for a fixed $\Pi_T$, the functions $\Im$ and $\Im^{-1}$ can be viewed as dynamical systems that are repeatedly applied to any sequence. The sequence X(t) is called the state vector at time t of the dynamical system. Repeatedly applying Equation 6 to X(t) evolves X(t) forward in time. Similarly, applying Equation 7 to a sequence devolves that sequence backward in time. Given an integer $T \geq 1$ and a collection of parameters $\Pi_T$ defined by Equation 9, Equations 6 or 7 are repeatedly applied to an initial sequence as described by the pseudo-code listing illustrated in Listing 1. Note that each of Steps 2 and 3 in pseudo-code Listing 1 consists of a number of substeps that depend on the details of the reversible nonlinear dynamical systems $\Im$ and $\Im^{-1}$ and the collection of parameters $\Pi_T$. One such multi-parameter family of reversible nonlinear dynamical systems is described next.

Inputs
  Initial sequence $$X(0) = [x_i^0]_{i=1}^{i=M}$$

Integer $T \geq 1$.
  Parameters $\Pi_T$ defined by Equations 9 through 17.
Processing
  Step 1. For each t=1, 2, ..., T do steps 2 through 4.
  Step 2. If p(t)=+1 then compute $X(t+1) = \Im(X(t); \Pi_T)$.
  Step 3. If p(t)=-1 then compute $X(t) = \Im^{-1}(X(t+1); \Pi_T)$.
  Step 4. Increment index t=t+1.
Outputs
  Final sequence $$X(T) = [x_i^0]_{i=1}^{i=M}$$

Listing 1 above is a pseudo-code listing illustrating the application of the reversible nonlinear dynamical systems, defined by Equations 6 and 7, and the collection of parameters $\Pi_T$, defined by Equation 9, to an initial sequence X(0). Specifications of A Discrete Dynamical System: $\Im$ and $\Im^{-1}$ Assume that there is given an integer $T \geq 1$, a collection of parameters $\Pi_T$, given in Equation 9, and a sequence X(t), as previously specified. The aggregate consequences of applying the reversible nonlinear dynamical systems $\Im$ and $\Im^{-1}$ to a sequence X(t) are specified by Equations 6 and 7. The individual consequences of applying $\Im$ and $\Im^{-1}$ to X(t) can be completely specified by the action of $\Im$ and $\Im^{-1}$ on a suitable subsequence $x_i^t$ of the sequence X(t). In this case, $\Im$ and $\Im^{-1}$ are described in terms of a nonlinear finite difference equation. One such dynamical system is disclosed in this section.

At time t the discrete dynamical systems that filter a given sequence X(t) depend on whether p(t)=+1 or p(t)=−1, as specified by Steps 2 and 3 in pseudo-code Listing 1. If p(t)=+1 then we denote the nonlinear finite difference equation that filters X(t) by $$x_i^{t+1} = F_i(X(t); \Pi_T), \quad (21)$$

where $F_i$ is used to distinguish the finite difference equation at spatial point i from the general dynamical system $\Im$. Correspondingly, if p(t)=−1 then we denote the nonlinear finite difference equation that filters X(t+1) by $$x_i^t = F_i^{-1}(X(t+1); \Pi_T), \quad (22)$$

where $F_i^{-1}$ is used to distinguish the finite difference equation at spatial point i from the general dynamical system $\Im^{-1}$. In Equations 21 and 22, the calculation of the intermediate space locations i ranges over $1 \leq i \leq L_m(t)$ for each index m=1, 2, . . . , M(t).

Next we specify a concrete discrete dynamical system $F_i$ and its inverse $F_i^{-1}$. At time t, the finite difference equation $F_i$ in Equation 21 is specified by $$F_i(X(t); \Pi_T) = \left( q_i^t + \sum_{l=1}^{l=r^l(t)} q_{i+l}^t - \sum_{l=1}^{l=r^l(t+1)} q_{i-l}^{t+1} + f_k(q_i^t) \sum_{l=1}^{l=r^l(t+1)} \delta_k(q_{i-l}^{t+1}) \sum_{l=1}^{l=r^r(t)} \delta_k(q_{i+l}^t) - 1 \right) \bmod k(t), \quad (23)$$

and $F_i^{-1}$ in Equation 22 is specified by $$F_i^{-1}(X(t+1); \Pi_T) = \left( q_i^{t+1} + \sum_{l=1}^{l=r^l(t+1)} q_{i-l}^{t+1} - \sum_{l=1}^{l=r^r(t)} q_{i+l}^t + g_k(q_i^{t+1}) \sum_{l=1}^{l=r^l(t+1)} \delta_k(q_{i-l}^{t+1}) \sum_{l=1}^{l=r^r(t)} \delta_k(q_{i+l}^t) + 1 \right) \bmod k(t), \quad (24)$$

The variables $q_i^t$ are defined by $$q_i^t = \begin{cases} b_i^l(t), & \text{if } (1 - r^l(t)) \leq i \leq 0; \\ x_i^t, & \text{if } 1 \leq i \leq L_m(t); \\ b_i^r(t), & \text{if } (L_m(t) + 1) \leq i \leq (L_m(t) + r^r(t)), \end{cases} \quad (25)$$

where $b_i^l(t)$, $b_i^r(t)$, $r^l(t)$ and $r^r(t)$ are elements of $\Pi_T$. For convenience, we enumerate $q_i^t$ in such a way that the intermediate state vector $x_i^t$ is always in the region $1 \leq i \leq L_m(t)$. The function $\delta_k(q)$ is defined for $k \geq 2$ by $$\delta_k(q) = \frac{1}{(k-1)!} \prod_{l=1}^{l=k-1} (l-q), \quad (26)$$

or, equivalently, $$\delta_k(q) = \begin{cases} 1, & \text{if } (q \bmod k) = 0; \\ 0, & \text{otherwise.} \end{cases} \quad (27)$$

The coefficient functions $f_k(q)$ and $g_k(q)$ appearing in Equations 23 and 24 are defined by the condition that Equations 23 and 24 be inverses of each other. In general, $f_k(q)$ and $g_k(q)$ satisfy the conditions $$(f_k(q_i^t) + g_k(q_i^{t+1})) \bmod k = 0. \quad (28)$$

One such pair of coefficients satisfying equation 28 and consistent with equations 23 and 24 used herein is $$f_k(q_i^t) = \delta_k(q_i^t) - \delta_k(q_i^t - 1), \quad (29)$$

$$g_k(q_i^{t+1}) = \delta_k(q_i^{t+1} + 1) - \delta_k(q_i^{t+1}). \quad (30)$$

One of ordinary skill in the art may recognize that there are other functions which may be applied to cryptographic systems.

Cryptographic Systems and General Nonlinear Dynamical Systems

A cryptographic system operates on finite sequences of integers X(t) using dynamical systems $\Im$ and $\Im^{-1}$ that are characterized by a key $$K = [T, \Pi_T]. \quad (31)$$

The encryption and decryption processes described herein are viewed as dynamical systems that iteratively perform computations on the sequences X(t) using the key K that defines the dynamic on X(t). Given an initial plaintext labeled X(0) and key K the encryption process computes ciphertext labeled X(T). Similarly, given ciphertext X(T) and key K the decryption algorithm computes plaintext X(0). Any intermediate sequence X(t) for $1 \leq t \leq T-1$ may be viewed as an intermediate representation of the plaintext or ciphertext.

For each $T \geq 1$ let the collection of parameters $\Pi_T$ $$\Pi_T = [[L(t), B^l(t), B^r(t), r^l(t), r^r(t), k(t), p(t)]] \ t=1, 2, \ldots, T \quad (32)$$

be grouped in terms of t as $$\Pi_T = [\Pi_t]_{t=1}^{t=T}. \quad (33)$$

where each $\Pi_t$ is referred to as the t-th sub-key, $$\Pi_t = [L(t), B^l(t), B^r(t), r^l(t), r^r(t), k(t), p(t)]. \quad (34)$$

In general, a T-stage encryption consists of T applications of a one-stage encryption and is expressed by the composition $$C = \bar{F}(P; \Pi_T) = \bigcirc_{t=1}^{t=T} \bar{F}(P; \pi_t) \quad (35)$$
$$= \bar{F}(\bar{F}( \ldots \bar{F}(\bar{F}(P; \pi_1); \pi_2); \ldots ; \pi_{T-1}); \pi_T).$$

The corresponding T-stage decryption consists of T applications of a one-stage decryption and is expressed by the composition $$P = \bar{F}^{-1}(C; \Pi_T) = \bigcirc_{t=T}^{t=1} \bar{F}^{-1}(C; \pi_t) \quad (36)$$
$$= \bar{F}^{-1}(\bar{F}^{-1}( \ldots \bar{F}^{-1}(\bar{F}^{-1}(C; \pi_T); \pi_{T-1}); \ldots ; \pi_2); \pi_1).$$

Each of dynamical systems $\Im$ and $\Im^{-1}$ is applied to the state vector X(t) as described in aggregate by Equations 6 and 7

(see pseudo-code Listing 1) or individually by Equations 21 and 22. The decryption process uses the same parameters $\Pi_t$ as in encryption, but in the reverse order. Specifications of the Method and Apparatus Regarding Cryptographic Systems FIG. 6 is a block diagram describing a system for using reversible, nonlinear, discrete, dynamical systems, described herein, for the purposes of cryptographically transforming a plaintext sequence into a ciphertext sequence. Associated with the information source is a transmitter 500, and with the information sink a receiver 554.

The information to be encrypted is provided as input to the cryptographic system transmitter 500. The source of this information is independent of the invention described herein, but can typically be represented by, for example, an information source such as a computer network, a coaxial cable distribution network, radio/telephony voice input, etc. The information source contains symbols typically associated with the information generator, for example, a bank, a telecommunications company, etc.

For the purposes of this section, the information source can be viewed as a stream of ASCII symbols such as typically associated with a standard typewriter/computer keyboard. Additionally, and for clarity in the present discussion, the key elements k(t), in $\Pi_T$ of the key K, are restricted to k(t)=2 for each t=1, 2, ..., T. Therefore there is associated with each input symbol an arbitrary binary representation. Table 1 illustrates one typical binary representation for many of the characters found on a typical typewriter keyboard (e.g., part of a standard ASCII character set).

Encoder 501 receives the input data (plaintext) via path 510 from transmitter 500 and transforms the input information into a representation suitable for the operation of the nonlinear dynamical system. One such encoding table is shown in Table 1. Such an encoder is also used as the decoder 553 to transform the representation of the decrypted message generated by the nonlinear discrete dynamical system back into a collection of symbols representing the plaintext generated by the information source at transmitter 500. Such an encoder/decoder combination is also referred to herein as the encoder, the decoder, or the encoder/decoder, individually and collectively.

The reversible nonlinear dynamical system requires, in addition to a suitable representation of the information source, a key specified by an integer $T \geq 1$ and a collection of parameters specified by $\Pi_T$ in Equation 32. This collection of integer parameters thus specified are associated with the key source 502 and 551. In any manner, the key source 502 used to encrypt must provide the same key as key source 551 used to decrypt. In certain applications, the key source may be provided by manual processes while in other applications, the key may be transferred via communication protocols. The particular environment and security requirements of the application of the present invention will determine the methods or devices used to transmit or generate the key information for both encryption and decryption.

Element 503 receives the encoded plaintext string on path 511 and the key on path 512 and iteratively operates the dynamical systems of the present invention to generate a cyphertext string on path 513 corresponding to the plaintext string on path 511. Likewise, element 553 operates the dynamical systems of the present invention using the key as input on path 561 and a ciphertext string on path 560 to generate a plaintext string on path 563.

As noted elsewhere herein, the encryption aspects of the present invention (represented as elements 500–503 in FIG. 6) and the decryption aspects of the present invention (represented as elements 551–554 of FIG. 6) may operate within a single device or within separate devices. Transfer of a ciphertext string from the encryption device to the decryption device may be by any of several means including communication channels, storage devices, manual transfer, etc.

The algorithms illustrated below in pseudo-code form describe the steps taken by the cryptographic system to implement the encryption and decryption system processing flows illustrated in FIG. 6. Moreover, the algorithms presented below do not address the issue of efficient implementation of the cryptographic system. An efficient implementation and any modifications and variations to the algorithms presented below may readily occur to those skilled in the art.

TABLE 1

| Symbol | Binary Rep. | Symbol | Binary Rep. | Symbol | Binary Rep | Symbol | Binary Rep. |
|---|---|---|---|---|---|---|---|
| a | 0000001 | A | 1000001 | space | 0011011 | = | 0110101 |
| b | 0000010 | B | 1000010 | , | 0011100 | > | 0110110 |
| c | 0000011 | C | 1000011 | . | 0011101 | < | 0110111 |
| d | 0000100 | D | 1000100 | 0 | 0011110 | ; | 0111000 |
| e | 0000101 | E | 1000101 | 1 | 0011111 | : | 0111001 |
| f | 0000110 | F | 1000110 | 2 | 0100000 | [ | 0111010 |
| g | 0000111 | G | 1000111 | 3 | 0100001 | ] | 0111011 |
| h | 0001000 | H | 1001000 | 4 | 0100010 | { | 0111100 |
| i | 0001001 | I | 1001001 | 5 | 0100011 | } | 0111101 |
| j | 0001010 | J | 1001010 | 6 | 0100100 | ? | 0111110 |
| k | 0001011 | K | 1001011 | 7 | 0100101 | / | 0111111 |
| l | 0001100 | L | 1001100 | 8 | 0100110 | \| | 1100000 |
| m | 0001101 | M | 1001101 | 9 | 0100111 | " | 1100010 |
| n | 0001110 | N | 1001110 | ! | 0101000 | ' | 1100011 |
| o | 0001111 | O | 1001111 | @ | 0101001 | ' | 1100100 |
| p | 0010000 | P | 1010000 | # | 0101010 | tab | 1100101 |
| q | 0010001 | Q | 1010001 | $ | 0101011 | ~ | 1100110 |
| r | 0010010 | R | 1010010 | % | 0101100 | | |
| s | 0010011 | S | 1010011 | ^ | 0101101 | | |
| t | 0010100 | T | 1010100 | & | 0101110 | | |
| u | 0010101 | U | 1010101 | * | 0101111 | | |

TABLE 1-continued

| Symbol | Binary Rep. | Symbol | Binary Rep. | Symbol | Binary Rep | Symbol | Binary Rep. |
|---|---|---|---|---|---|---|---|
| v | 0010110 | V | 1010110 | ( | 0110000 | | |
| w | 0010111 | W | 1010111 | ) | 0110001 | | |
| x | 0011000 | X | 1011000 | - | 0110010 | | |
| y | 0011001 | Y | 1011001 | _ | 0110011 | | |
| z | 0011010 | Z | 1011010 | + | 0110100 | | |

Table 1 above is an arbitrary binary representation of many of the characters found on a typical typewriter keyboard. This illustrates an encoding/decoding process by which alphanumeric characters are encoded into unique 7-bit binary representations. Note that the example table 1 is a table which may be applied to encoding a plaintext string into a seven bit code. For use in an encoding procedure from ciphertext an expanded table is required to permit decoding (encoding) of all 128 unique seven bit codes. One of ordinary skill will recognize that the decoding of a ciphertext string into unique seven bit codes is not a necessary step. It is shown herein simply for purposes of showing that an encrypted ciphertext string is potentially displayable (e.g., seven bit ASCII codes). There is no need to perform such a decoding step to "display" the encrypted ciphertext string.

Encryption Alogorithm

The following is a description of an algorithm for Iterative Encryption of an Information Source in accordance with the present invention.

Inputs

1. An information source or plaintext P that consists of S symbols. Each symbol in the message has associated with it an index s that corresponds e.g. to its position in the message. Therefore each symbol in the message is identified as $P_s$ where s=1, 2, ..., S.

2. A unique encoding process as described above with respect to Table 1, or one such equivalent, that encodes each symbol appearing in the information source into a $\lceil$-bit representation suitable for use by the nonlinear dynamical system. For example, referring to Table 1, the symbol J is encoded by the 7-bit representation 1001010.

3. A key K consisting of an integer T≧1 and a collection of integer parameters $\Pi_T$.

Processing

1. Encoding: Each symbol in the information source or message is encoded one at a time and the resulting encoded representation is placed in a memory structure or its equivalent in a fashion that is contiguous with previously encoded symbols. Therefore, given a message P of length S, a unique $\lceil$-bit encoding process, and an initial state vector X(0) represented by a memory structure of length M=S×$\lceil$, with individual elements $x_i^0$, the message P is encoded as follows:
   Step 1 For s=1, 2, ..., S do Steps 2 and 3.
   Step 2 Encode symbol $P_s$ in its $\lceil$-bit representation $Y_1$, $Y_2$, ... $Y_7$.
   Step 3 Place the elements of the encoded symbol $Y_1$, $Y_2$, ... $Y_l$ into the state vector, i.e. for l=1, 2, ..., $\lceil$, set $x^0_{(s-1)*\lceil+l}=Y_l$.
   The result of the encoding process is an initial state vector, or equivalent memory structure, labeled X(0) that consists of a representation of the input message. Specifically, the initial state vector X(0) consists of elements $x_i^0$ where i=1, 2, ..., S×7=M.

2. Encrypting: Given the key K=[T,$\Pi_T$], the initial state vector X(0)=[$x_i^0$] for i=1, 2, ..., M corresponding to the plaintext, and formed by the encoding process, is encrypted as follows:
   Step 1 For each t=1, 2, ..., T do Steps 2 and 3
   Step 2 If p(t)>0 then compute X(t+1) as follows:
   Step 2.1 For each i=1, 2, ..., M compute $x_i^{t+1}$ via Equation 23
   Step 3 If p(t)<0 then compute X(t) as follows:
   Step 3.1 For each i=M, M-1, ..., 2, 1 compute $x_i^{t-1}$ via Equation 24

Outputs

1. Ciphertext: The output from the encryption step described above is a final state vector X(T)=[$x_i^T$], i=1, 2, ..., M.

Decryption Algorithm

The following is a description of an Algorithm for Iterative Decryption of Ciphertext Generated by the Cryptographic System in accordance with the present invention.

Inputs

1. Ciphertext generated by the encryption process described schematically by FIG. 6 and algorithmically as above. This input to the decryption process is a final state vector X(T)=[$x_i^T$], i=1, 2, ..., M.

2. A key K consisting of an integer T≧1 and the collection of integer parameters $\Pi_T$ used to encrypt the ciphertext.

3. A unique decoding process as described herein with reference to Table 1 above, or its equivalent, that decodes each $\lceil$-bit representation appearing in the decrypted message into a unique alphanumeric character appearing in the original plaintext message. For example, referring to Table 1, the 7-bit representation 1001010 is decoded to the symbol J.

Processing

1. Decrypting: Given the key K=[T,$\Pi_T$], the initial state vector X(T)=[$x_i^T$] for i=1, 2, ..., M corresponding to the ciphertext, is decrypted as follows:
   Step 1 For each t=T, T-1, ..., 1 do Steps 2 and 3
   Step 2 If -p(t)>0 then compute X(t+1) as follows:
   Step 2.1 For each i=1, 2, ..., M compute $x_i^{t+1}$ via Equation 23
   Step 3 If -p(t)<0 then compute X(t) as follows:
   Step 3.1 For each i=M, M-1, ..., 2, 1 compute $x_i^{t-1}$ via Equation 24

2. Decoding: Given a initial state vector $X^0$, generated by the decryption process, and represented by a memory structure of length M, with individual elements $x_i^0$, the original plaintext message P is decoded as follows:
   Step 1 For s=1, 2, ..., S do Steps 2 and 3
   Step 2 For l=1, 2, 3, ..., $\lceil$, set $y_l=x^0(s-1)*\lceil+l$
   Step 3 Decode the 7-bit representation $y_1$, $y_2$, ..., $y_l$ into its symbol $P_s$
   The result of the decoding process is the initial plaintext message P.

Outputs

1. Plaintext The output from the decoding step described above is a message P that consists of S symbols and corresponds to the plaintext.

Figure 7:
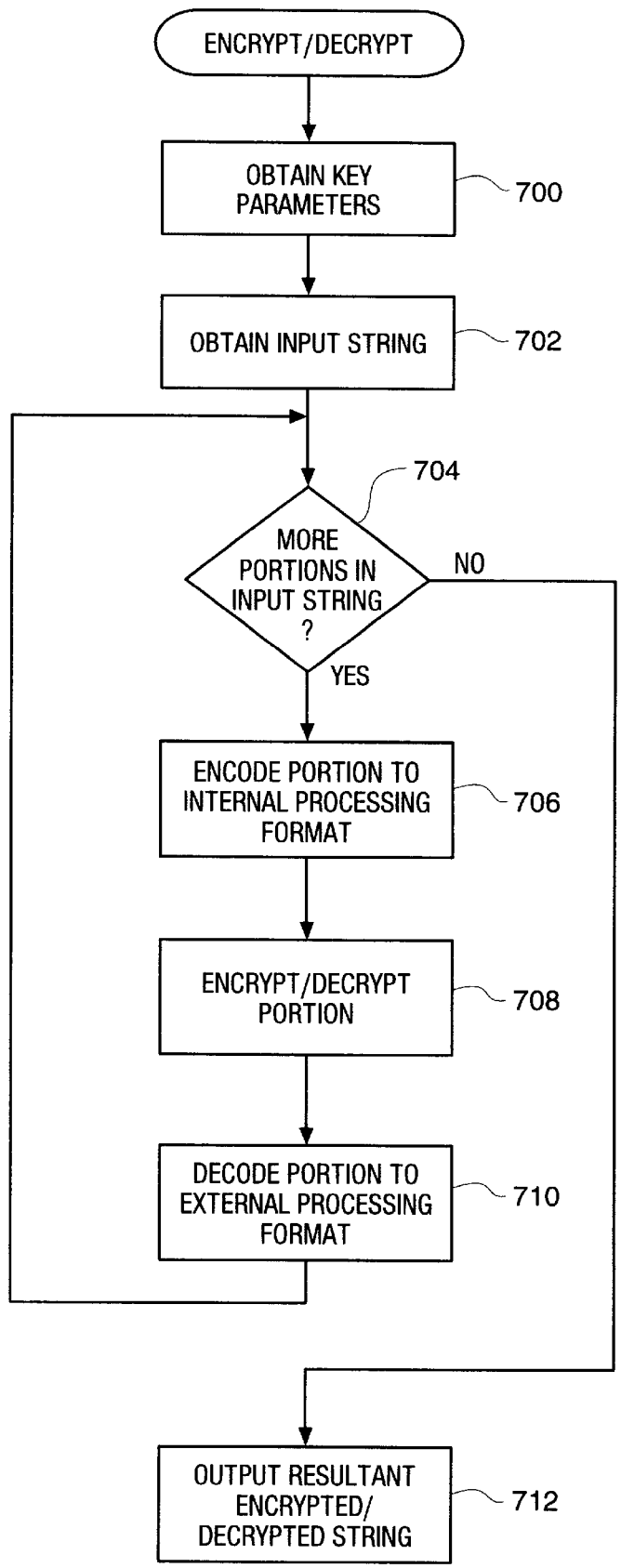
FIG. 7 is a flowchart describing the high level flow of an encryption/decryption method in accordance with the present invention as depicted in FIG. 6.
Figure 8:
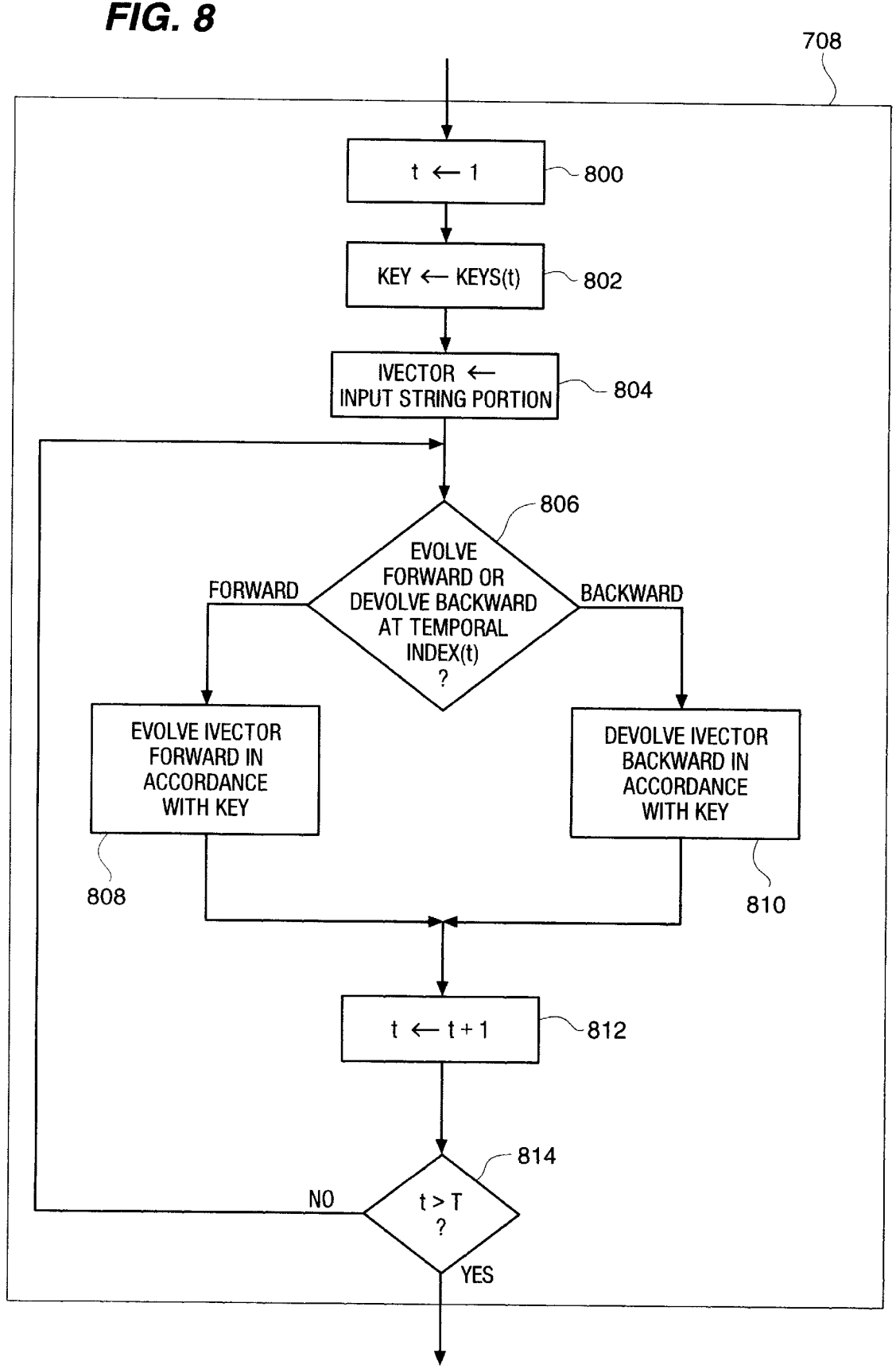
FIG. 8 is a flowchart describing additional details of the operation of the method of FIG. 7.

FIGS. 7 and 8 are flowcharts describing the operation of the above pseudo-coded algorithms. FIG. 7 is a flowchart describing the high level operation of an encryption or decryption operation in accordance with the present invention. Element 700 is first operable to obtain the encryption/decryption key. As presented herein, the key is a collection of parameters which control the operation of the discrete dynamical systems exemplified above as equations 23 and 24. The parameters may be an essentially arbitrary collection of values for controlling the computation of the reversible dynamical system. The key is used in encryption to evolve a plaintext string forward in time to generate a ciphertext string as well as to devolve a ciphertext string backward in time to restore the original plaintext string.

One of ordinary skill will recognize that the key parameters may be obtained by any of several means and may be represented in any of several forms. For example, the key parameters may be either electronically or manually presented to the methods of the present invention.

Element 702 is next operable to obtain the input string for processing by the methods of the present invention to produce a resultant output string. The methods of the present invention as depicted in the flowchart of FIGS. 7 and 8 represent both the encryption process and the decryption process. The two processes are essentially identical procedures and differ only in the equation used to evolve the input string forward in time or devolve the input string backward in time. Specifically, the encryption process evolves the plaintext string (the input string) forward in time into the ciphertext string (the output string) by application of equation 23 above while the decryption process devolves the ciphertext string (input string) backward in time to produce the plaintext string (output string) by application of equation 24 above.

Elements 704–710 are iteratively operable to encrypt or decrypt (evolve or devolve) portions of the input string to generate corresponding portions of the output string. In certain applications of the present invention it may be desirable to encrypt or decrypt the input string in portions. For example, encryption of a video image may be decomposed into encryption of each horizontal scan line (portion) of the video image, or, for example, encryption of disk storage contents may be performed on a block by block (portion) basis. Such subdivisions of the input string may naturally occur in certain data processing applications of the present invention while in other applications, the entire input string may be processed as an integral unit. The flowchart of FIG. 7 describes the methods of the present invention where there is one or more portions of the input string.

In particular, element 704 determines whether additional portions of the input string remain to be processed. If so, processing continues with element 706, otherwise processing completes with element 712. Element 706 is operable to encode the present portion of the input string as discussed above. For example, the input string may be provided in the form of 7-bit ASCII encoded characters. Elements 706 may therefore "encode" the 7-bit characters into the internal format used for encrypting the string (e.g., a string of contiguous bits).

Element 708 then applies either equation 23 or equation 24 to the present portion of the input string to encrypt (evolve forward) or to decrypt (devolve backward), respectively. The application of equation 23 or 24 produces the evolved (encrypted) or devolved (decrypted) output string corresponding to the present portion of the input string. Element 710 then decodes the internal representation (e.g., bit string) of the output string into the format used for external representation of the string (e.g., 7-bit ASCII). Processing then continues by looping back to element 704 to process additional portions of the input string.

The decoded output string corresponding to the present portion of the input string is concatenated with the output string generated by processing of earlier portions of the input string (e.g., earlier iterations of elements 704–710). When element 704 determines that no further portions of the input string remain to be processed, element 712 is then operable to return the resultant output string encrypted/decrypted portion by portion and decoded into the format used for external representation of the output string.

One of ordinary skill will recognize that the encoding and decoding steps of elements 706 and 710 may not be required in many applications of the present invention. For example, many application of the methods of the present invention will provide input strings already coded as a string of contiguous bits and will utilize the output string in the same binary format. Likewise, the features of the present invention described in FIG. 7 which subdivide the input string into portions may not be required in many applications. For example, many applications will apply the methods of the present invention to fixed size or small finite size information packets. Such applications will not likely require the input string to be subdivided into portions for application of the encryption/decryption methods.

FIG. 8 provides additional detail of the operation of element 708 of FIG. 7 which applies equation 23 or 24 to encrypt (evolve) or decrypt (devolve) the input string. As noted above, a key may be comprised of an essentially arbitrary collection of parameters for controlling the dynamical system (equations 23 and 24 above). In particular, the key $K=[T,\Pi_T]$ is comprised of a set of subkey elements, each corresponding to a set of parameters $\Pi_t$ to be used by the dynamical system at temporal index t=1, 2, . . . T Element 708 of FIG. 8 therefore computes the states of the dynamical system for each of the subkey elements in sequence.

Specifically, element 800 initializes a first loop counter variable (temporal index) t to 1. Element 802 then retrieves the subkey parameters corresponding to the fth subkey element of the KEYS structure and stores it in the variable KEY. Element 804 then initializes the intermediate vector (IVECTOR) to the value of the input string portion supplied as a parameter to the operation of element 708. Elements 806–814 then step the dynamical system through its states for t equals 1 through T (the number of temporal states to be processed by the dynamical system as specified in the key K).

Element 806 determines whether the particular subkey element calls for the dynamical system to be evolved forward or backward. If forward, element 808 is operable to evolve the dynamical system forward in accordance with the subkey parameters KEY and equation 23. If element 806 determines that the dynamical system is to be devolved backward in time, element 810 is operable to devolve the dynamical system backward in accordance with the subkey parameters KEY and equation 24.

In both cases, element 812 is then operable to increment the loop counter variable (temporal index) t and element 814 determines whether the counter has exceeded the limit T as specified by the keys K. If not, processing loops back to element 806. Otherwise processing of element 708 is complete.

The flowcharts of FIGS. 7 and 8 are intended to suggest an implementation of the methods of the present invention. One of ordinary skill in the software arts will readily recognize many standard software optimizations and data structures to improve the computational performance of the method as well as optimizations unique to the particular application of the method. Likewise, one of ordinary skill in the digital design arts will readily recognize equivalent circuit designs to perform or assist in the computations of the dynamical systems.

Illustrative Examples: Cryptographic System

The cryptographic system herein described can be applied to any form of information that can be represented by collections of symbols taken from a finite set or alphabet. The illustrative examples discussed next are meant for clarification and are not intended to limit the scope of the present invention to textual applications. Moreover, it is recognized that the implementation, and its equivalents, of variable length nonlinear feedback shift registers described herein, and the realization of cryptographic systems based on NLFSR's described in terms of reversible nonlinear discrete dynamical systems may be readily modified by those skilled in the art. Consequently, it is intended that these examples be solely for illustrative purposes, and the applications of the herein disclosed invention to other specific forms of information are readily acknowledged.

In order to illustrate the effect of varying the key elements $K=[T,\Pi_T]$ the plaintext is fixed to be the five symbol string '12345' and the corresponding encoded plaintext, that has been generated using Table 1, is the 5×7=35-bit representation $$0011111\ 0100000\ 0100001\ 0100010\ 0100011 \qquad (37)$$

where there are spaces artificially introduced to delineate each encoded symbol in the plaintext. Each example below provides the plaintext Equation 37, X(0), the key $K=[T,\Pi_T]$, each intermediate state vector X(t), and the final ciphertext, X(T).

EXAMPLE 1

In this example, the key, $K=[T,\Pi_T]$, consists of the integer $$T=18, \qquad (38)$$

and for each t=1, 2, ..., T, the set of parameters $\Pi_T$ is given by $$M(t) = 1, \qquad (39)$$
$$L_m(t) = 35,\ m = 1, 2, \ldots, M(t),$$
$$k(t) = 2,$$
$$b_i^l(t) = 0,\ i = 1, 2, \ldots, r^l(t),$$
$$b_i^r(t) = 0,\ i = 1, 2, \ldots, r^r(t),$$

where $$r^l(t) = r^r(t+1) = \begin{cases} 5, & 1 \le t \le 6; \\ 2, & 7 \le t \le 16; \\ 8, & 17 \le t \le 18, \end{cases} \qquad (40)$$

and $$p(t) = \begin{cases} +1, & 1 \le t \le 6; \\ -1, & 7 \le t \le 16; \\ +1, & 17 \le t \le 18. \end{cases} \qquad (41)$$

The results of applying the encryption and decryption processes outlined in the above encryption/decryption algorithms are presented below in Table 2.

EXAMPLE 2

In this example, the parameters T, M(t), $L_m(t)$, $r^l(t)$, $r^r(t)$, and p(t) in the key K are the same as in Example 1 above. However the number of elements k(t) in the alphabet varies according to $$k(t) = \begin{cases} 2, & 1 \le t \le 6; \\ 3, & 7 \le t \le 16; \\ 5, & 17 \le t \le 18. \end{cases} \qquad (42)$$

Table 3 below presents the results of applying the encryption and decryption processes outlined in the encryption/decryption algorithms above. Note that the intermediate state vector consists of elements from finite sets of 2, 3, and 5 elements. Although varying $k(t) \ne 2$ may not be advantageous from the perspective of the ubiquitousness of binary information sources, the cryptographic system herein described is applicable to information sources having a symbolic representation comprising any number of elements.

EXAMPLE 3

In this example, the parameters T, M(t), $L_m(t)$, k(t), $r^l(t)$, $r^r(t)$, and p(t) in the key K are the same as in Example 1, however, now the boundary conditions are non-zero. The boundary conditions are specified by the tuples $B^l(t)=[b_i^l(t)]$ and $B^r(t)=[b_i^r(t)]$ (defined by Equations 12 and 13) and depend on the variation in $r^l(t)$ and $r^r(t)$, respectively. Expanding $[b_i^l(t)]$ and $[b_i^r(t)]$ using $r^l(t)$ and $r^r(t)$, given by Equation 40, yields, $$B^l(t) = [b_i^l(t)] = \qquad (43)$$
$$\begin{cases} [b_1^l(t), b_2^l(t), b_3^l(t), b_4^l(t), b_5^l(t)] = [11011] & 1 \le t \le 6; \\ [b_1^l(t), b_2^l(t)] = [11] & 7 \le t \le 16; \\ [b_1^l(t), b_2^l(t), \ldots, b_7^l(t), b_8^l(t)] = [11011011] & 17 \le t \le 18, \end{cases}$$

and $$B^r(t) = [b_i^r(t)] = \qquad (44)$$
$$\begin{cases} [b_1^r(t), b_2^r(t), b_3^r(t), b_4^r(t), b_5^r(t)] = [11011] & 0 \le t \le 5; \\ [b_1^r(t), b_2^r(t)] = [11] & 6 \le t \le 15; \\ [b_1^r(t), b_2^r(t), \ldots, b_7^r(t), b_8^r(t)] = [11011011] & 16 \le t \le 17. \end{cases}$$

Table 4 below presents the results of applying the encryption and decryption processes outlined in the encryption/decryption algorithms above.

EXAMPLE 4

In this example, the parameters T, M(t), $L_m(t)$, k(t), $r^l(t)$, $r^r((t)$, and p(t) in the key K are the same as in Example 3, however, the boundary conditions vary according to $$B^l(t) = [b_i^l(t)] = \qquad (45)$$
$$\begin{cases} [b_1^l(t), b_2^l(t), b_3^l(t), b_4^l(t), b_5^l(t)] = [11011] & 1 \le t \le 6; \\ [b_1^l(t), b_2^l(t)] = [11] & 7 \le t \le 16; \\ [b_1^l(t), b_2^l(t), \ldots, b_7^l(t), b_8^l(t)] = [11011011] & 17 \le t \le 18, \end{cases}$$

and

-continued $$B^r(t) = [b_i^r(t)] = \begin{cases} [b_1^r(t), b_2^r(t), b_3^r(t), b_4^r(t), b_5^r(t)] = [11101] \; 0 \leq t \leq 5; \\ [b_1^r(t), b_2^r(t)] = [11] \; 6 \leq t \leq 15; \\ [b_1^r(t), b_2^r(t), \ldots, b_7^r(t), b_8^r(t)] = [11101101] \; 16 \leq t \leq 17. \end{cases} \quad (46)$$

Table 5 below presents the results of applying the encryption and decryption processes outlined in the encryption/decryption algorithms.

Below are tables 2–5 which indicate the exemplary data in operation of the above examples 1–4, respectively. The tables describe an exemplary plaintext string which is encrypted to a corresponding ciphertext string in accordance with the key specification of each example above. In each case, the intermediate state vector portion of the first entry of the table (at time index t=0), is the plaintext string provided as input to the corresponding example encryption algorithm. The intermediate state vector portion of the middle entry of each table (at time index t=18) is the result of iteratively applying the associated algorithm in the "forward in time" direction to encrypt the plaintext string into a ciphertext string. Finally, the intermediate state vector portion of the last entry of the table (at time index t=0) is the plaintext string which results from iterative application of the associated decryption algorithm to the ciphertext string in the "backward in time" direction to decrypt the ciphertext string back into the corresponding plaintext string. In the examples shown, L(t) is a constant value of 35 for simplicity in the tabular display format. One of ordinary skill will recognize that the number of values is a variable parameter of the dynamical systems provided herein.

TABLE 2

| Time | Left B.C. | Intermediate State Vector i = 1 ... i = L(t) | Right B.C. |
|---|---|---|---|
| 0 | Unused | 00111110100000010000101000100100011 | 00000 |
| 1 | 00000 | 11001100020100001000001110010000011 | 00000 |
| 2 | 00000 | 11101111100001100010101101101001100 | 00000 |
| 3 | 00000 | 00000111000110100001000011000111110 | 00000 |
| 4 | 00000 | 01100001010010100011100001111010000 | 00000 |
| 5 | 00000 | 10011011100011000010001111110010110 | 00000 |
| 6 | 00000 | 0011100101100001010110100010101001 | 00 |
| 7 | 00 | 0010101110001000101110010000110011 | 00 |
| 8 | 00 | 1111010100011101110100011011110011 | 00 |
| 9 | 00 | 1100001010111000100010111001000110 | 00 |
| 10 | 00 | 1010000110001010100001100111000010 | 00 |
| 11 | 00 | 0110000100101011100001001011100001 | 00 |
| 12 | 00 | 1110011110110101000111011010001111 | 00 |
| 13 | 00 | 1100011000010010101110000100101110 | 00 |
| 14 | 00 | 1001010100010110001111000101101111 | 00 |
| 15 | 00 | 1011011100001100101001100110001110 | 00 |
| 16 | 00 | 110100100011110011010110011100111011 | 00000000 |
| 17 | 00000000 | 11010101010001011001001001111101001 | 00000000 |
| 18 | 00000000 | 11001000011111000110011110001101010 | Unused |
| 17 | 00000000 | 11010101010001011001001001111101001 | 00000000 |
| 16 | 00 | 110100100011110011010110011100111011 | 00000000 |
| 15 | 00 | 1011011100001100101001100110001110 | 00 |
| 14 | 00 | 1001010100010110001111000101101111 | 00 |
| 13 | 00 | 1100011000010010101110000100101110 | 00 |
| 12 | 00 | 1110011110110101000111011010001111 | 00 |
| 11 | 00 | 0110000100101011100001001011100001 | 00 |
| 10 | 00 | 1010000110001010100001100111000010 | 00 |
| 9 | 00 | 1100001010111000100010111001000110 | 00 |
| 8 | 00 | 1111010100011101110100011011110011 | 00 |
| 7 | 00 | 0010101110001000101110010000110011 | 00 |
| 6 | 00000 | 0011100101100001010110100010101001 | 00 |
| 5 | 00000 | 10011011100011000010001111110010110 | 00000 |
| 4 | 00000 | 01100001010010100011100001111010000 | 00000 |
| 3 | 00000 | 00000111000110100001000011000111110 | 00000 |

TABLE 2-continued

| Time | Left B.C. | Intermediate State Vector i = 1 ... i = L(t) | Right B.C. |
|---|---|---|---|
| 2 | 00000 | 11101111100001100010101101101001100 | 00000 |
| 1 | 00000 | 11001100010100001000001110010000011 | 00000 |
| 0 | Unused | 00111110100000010000101000100100011 | 00000 |

Table 2 above presents plaintext X(0), intermediate states X(0<t<18), ciphertext X(18), and decrypted ciphertext corresponding to Example 1 above. On each line is given, the 'time index' corresponding to the value of the variable t in Equations 23 and 24, the left boundary conditions, the intermediate state vector corresponding to an intermediate stage of the encryption or decryption process, and the right boundary conditions.

TABLE 3

| Time | Left B.C. | Intermediate State Vector i = 1 ... i = L(t) | Right B.C. |
|---|---|---|---|
| 0 | Unused | 00111110100000010000101000100100011 | 00000 |
| 1 | 00000 | 11001100010100001000001110010000011 | 00000 |
| 2 | 00000 | 11101111100001100010101101101001100 | 00000 |
| 3 | 00000 | 00000111000110100001000011000111110 | 00000 |
| 4 | 00000 | 01100001010010100011100001111010000 | 00000 |
| 5 | 00000 | 10011011100011000010001111110010110 | 00000 |
| 6 | 00000 | 0011100101100001010110100010101001 | 00 |
| 7 | 00 | 22020100020000022002120120022120002 | 00 |
| 8 | 00 | 10200211010000001221022202201222201 | 00 |
| 9 | 00 | 22121021102122022001202211011001211 | 00 |
| 10 | 00 | 20111100101211101102022120000000202 | 00 |
| 11 | 00 | 10211121011022121111112002100000012 | 00 |
| 12 | 00 | 11010022121021102122022001202211211 | 00 |
| 13 | 00 | 20000020111100101211110110202212002 | 00 |
| 14 | 00 | 10000001202112002010112102100020121 | 00 |
| 15 | 00 | 21221121100112211111222212112121022 | 00 |
| 16 | 00 | 12021020020110201220221001200200022 | 00000000 |
| 17 | 00000000 | 21314423141320002144323400224303403 | 00000000 |
| 18 | 00000000 | 02001113002301403210304403043424113 | Unused |
| 17 | 00000000 | 21314423141320003144323400224303403 | 00000000 |
| 16 | 00 | 12021020020110201220221001200200022 | 00000000 |
| 15 | 00 | 21221121100112211111222212112121022 | 00 |
| 14 | 00 | 10000001202112002010112102100020121 | 00 |
| 13 | 00 | 20000020111100101211110110202212002 | 00 |
| 12 | 00 | 11010022121021102122022001202211211 | 00 |
| 11 | 00 | 10211121011022121111112002100000012 | 00 |
| 10 | 00 | 20111100101211101102022120000000202 | 00 |
| 9 | 00 | 22121021102122022001202211011001211 | 00 |
| 8 | 00 | 10200211010000001221022202201222201 | 00 |
| 7 | 00 | 22020100020000022002120120022120002 | 00 |
| 6 | 00000 | 0011100101100001010110100010101001 | 00 |
| 5 | 00000 | 10011011100011000010001111110010110 | 00000 |
| 4 | 00000 | 01100001010010100011100001111010000 | 00000 |
| 3 | 00000 | 00000111000110100001000011000111110 | 00000 |
| 2 | 00000 | 11101111100001100010101101101001100 | 00000 |
| 1 | 00000 | 11001100010100001000001110010000011 | 00000 |
| 0 | Unused | 00111110100000010000101000100100011 | 00000 |

Table 3 above presents plaintext, intermediate states, ciphertext and decrypted ciphertext corresponding to Illustrative Example 2 above. See additional comments in Table 2.

TABLE 4

| Time | Left B.C. | Intermediate State Vector i = 1 ... i = L(t) | Right B.C. |
|---|---|---|---|
| 0 | Unused | 00111110100000010000101000100100011 | 11011 |
| 1 | 11011 | 10100001111001100101100011111110101 | 11011 |
| 2 | 11011 | 10000010001100001111000001101001100 | 11011 |
| 3 | 11011 | 01101010101011001100011000011111110 | 11011 |
| 4 | 11011 | 00001100111111010101010110100010000 | 11011 |

TABLE 4-continued

| Time | Intermediate State Vector |  |  |
|---|---|---|---|
|  | Left B.C. i = 1 | i = L(t) | Right B.C. |
| 5 | 11011 | 111101100000110000101110001010110 | 11011 |
| 6 | 11011 | 010101111011100101000001100110100 | 11 |
| 7 | 11 | 111100010110010101100000100101111 10 | 11 |
| 8 | 11 | 110110001100101100010000101101111 0 | 11 |
| 9 | 11 | 110100101001011001010000100010011 | 11 |
| 10 | 11 | 011001101110110010110000011010110 11 | 11 |
| 11 | 11 | 111111001001111100010000101001111 1 | 11 |
| 12 | 11 | 110110111011010110101000001011011 110 | 11 |
| 13 | 11 | 101111111001001111100001000101001 | 11 |
| 14 | 11 | 101001101101011011101000011010111 10 | 11 |
| 15 | 11 | 110011010010011111100100001111100 1 | 11 |
| 16 | 11 | 101110100101110101011110000100110 10 | 11011011 |
| 17 | 11011011 | 010111011111011001011111011111101 1 | 11011011 |
| 18 | 11011011 | 101101010111110111011010110011000 | Unused |
| 17 | 11011011 | 010111011111011001011111011111101 1 | 11011011 |
| 16 | 11 | 101110100101110101011110000100110 10 | 11011011 |
| 15 | 11 | 110011010010011111100100001111100 1 | 11 |
| 14 | 11 | 101001101101011011101000011010111 10 | 11 |
| 13 | 11 | 101111111001001111100001000101001 | 11 |
| 12 | 11 | 110110111011010110101000001011011 110 | 11 |
| 11 | 11 | 111111001001111100010000101001111 1 | 11 |
| 10 | 11 | 011001101110110010110000011010110 11 | 11 |
| 9 | 11 | 110100101001011001010000100010011 | 11 |
| 8 | 11 | 110110001100101100010000101101111 01 | 11 |
| 7 | 11 | 111100010110010101100000100101111 10 | 11 |
| 6 | 11011 | 010101111011100101000001100110100 | 11 |
| 5 | 11011 | 111101100000110000101110001010110 | 11011 |
| 4 | 11011 | 000011001111110101010101101001000 0 | 11011 |
| 3 | 11011 | 011010101010110011001100000111100 | 11011 |
| 2 | 11011 | 100000100011000011100000110100110 0 | 11011 |
| 1 | 11011 | 101000011110011001011001111111010 1 | 11011 |
| 0 | Unused | 001111010000001000010100010010001 | 11011 |

Table 4 above presents plaintext, intermediate states, ciphertext and decrypted ciphertext corresponding to Illustrative Example 3. See additional comments in Table 2.

TABLE 5

| Time | Intermediate State Vector |  |  |
|---|---|---|---|
|  | Left B.C. i = 1 | i = L(t) | Right B.C. |
| 0 | Unused | 001111010000001000010100010010001 1 | 11101 |
| 1 | 11011 | 101000011110011001011001111111100 11 | 11101 |
| 2 | 11011 | 100000100011000011100000111000101 0 | 11101 |
| 3 | 11011 | 011010101010110011000101000001111 000 | 11101 |
| 4 | 11011 | 000011001111110100110110101110101 10 | 11101 |
| 5 | 11011 | 111101100000000010011010010000000 | 11101 |
| 6 | 11011 | 010101100101000011000011110101011 11 | 11101 |
| 7 | 11 | 100111001011000010100010101111000 10 | 11 |
| 8 | 11 | 011100111000100010111010001111010 10 | 11 |
| 9 | 11 | 100101011100011010000101000011101 000 | 11 |
| 10 | 11 | 000110101000111001011101011110001 01 | 11 |
| 11 | 11 | 010101001101001110111100111110101 01 | 11 |
| 12 | 11 | 010001110111001100111110101111010 001 | 11 |
| 13 | 11 | 010000111001010111100110100010000 | 11 |
| 14 | 11 | 001011110001101010000110010111010 11 | 11 |
| 15 | 11 | 010110011000111110000011110111100 11 | 11 |
| 16 | 11 | 100111110010101010000101011111010 1 | 11101101 |
| 17 | 11011011 | 100010001001001110001100010010111 | 11101101 |
| 18 | 11011011 | 001110100100000101100001110001000 100 | Unused |
| 17 | 11011011 | 100010001001001110001100010010111 | 11101101 |
| 16 | 11 | 100111110010101010000101011111010 1 | 11101101 |
| 15 | 11 | 010110011000111110000011110111100 11 | 11 |
| 14 | 11 | 001011110001101010000110010111010 11 | 11 |
| 13 | 11 | 010000111001010111100110100010000 | 11 |
| 12 | 11 | 010001110111001100111110101111010 001 | 11 |
| 11 | 11 | 010101001101001110111100111110101 01 | 11 |
| 10 | 11 | 000110101000111001011101011110001 01 | 11 |
| 9 | 11 | 100101011100011010000101000011101 000 | 11 |
| 8 | 11 | 011100111000100010111010001111010 10 | 11 |
| 7 | 11 | 100111001011000010100010101111000 10 | 11 |
| 6 | 11011 | 010101100101000011000011110101011 11 | 11011 |
| 5 | 11011 | 111101100000000010011010010000000 | 11101 |
| 4 | 11011 | 000011001111110100110110101110101 10 | 11101 |
| 3 | 11011 | 011010101010110011000101000001111 000 | 11101 |
| 2 | 11011 | 100000100011000011100000111000101 0 | 11101 |
| 1 | 11011 | 101000011110011001011001111111100 11 | 11101 |
| 0 | Unused | 001111010000001000010100010010001 | 11101 |

Table 5 presents plaintext, intermediate states, ciphertext and decrypted ciphertext corresponding to Illustrative Example 4. See additional comments in Table 2.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. An electronic implemented method for encrypting a plaintext string of digital data comprising the steps of:
   providing a key comprising a finite collection of arbitrary integer parameters; and
   applying said plaintext string as input to a reversible, nonlinear, discrete partial difference equation computation means operable in accordance with said arbitrary integer parameters of said key to generate a cyphertext string corresponding to said plaintext string wherein said reversible, nonlinear, discrete partial difference equation computation means is a nonlinear feedback shift register.

2. The method of claim 1 wherein said collection of arbitrary integer parameters includes a length parameter defining a plurality of subsequences of said plaintext string each having a length equal to said length parameter wherein said computation means is operable on each of said plurality of subsequences of said plaintext string to generate said cyphertext string.

3. The method of claim 1 wherein said collection of arbitrary integer parameters includes a plurality of length parameters defining a plurality of subsequences of said plaintext string each having a length equal to one of said plurality of length parameters wherein said computation means is operable on each of said plurality of subsequences of said plaintext string to generate said cyphertext string.

4. The method of claim 1 wherein number of operations performed by said computation means is proportional to the size of said plaintext string.

5. An electronic implemented method for decrypting a cyphertext string of digital data comprising the steps of:
   providing a key comprising a finite collection of arbitrary integer parameters; and
   applying said cyphertext string as input to a reversible, nonlinear, discrete partial difference equation computation means operable in accordance with said arbitrary integer parameters of said key to generate a plaintext string corresponding to said cyphertext string wherein said reversible, nonlinear, discrete partial difference equation computation means is a nonlinear feedback shift register.

6. The method of claim 5 wherein said collection of arbitrary integer parameters includes a length parameter defining a plurality of subsequences of said cyphertext string each having a length equal to said length parameter wherein said computation means is operable on each of said plurality of subsequences of said cyphertext string to generate said plaintext string.

7. The method of claim 5 wherein said collection of arbitrary integer parameters includes a plurality of length parameters defining a plurality of subsequences of said cyphertext string each having a length equal to one of said plurality of length parameters wherein said computation means is operable on each of said plurality of subsequences of said cyphertext string to generate said plaintext string.

8. The method of claim 5 wherein the number of operations performed by said computation means is proportional to the size of said cyphertext string.

9. An electronic implemented method for encrypting and decrypting a plaintext string of digital data comprising the steps of:

providing a key comprising a finite collection of arbitrary integer parameters;

applying said plaintext string as input to a first reversible, nonlinear, discrete partial difference equation computation means operable in accordance with said arbitrary integer parameters of said key to generate a cyphertext string corresponding to said plaintext string wherein said first reversible, nonlinear, discrete partial difference equation computation means is a nonlinear feedback shift register; and applying said cyphertext string as input to a second reversible, nonlinear, discrete partial difference equation computation means operable in accordance with said arbitrary integer parameters of said key to generate a plaintext string corresponding to said cyphertext string wherein said second reversible, nonlinear, discrete partial difference equation computation means is a nonlinear feedback shift register.

10. The method of claim 9 wherein said collection of arbitrary integer parameters includes a length parameter defining a plurality of subsequences of said plaintext string each having a length equal to said length parameter wherein said computation means is operable on each of said plurality of subsequences of said plaintext string to generate said cyphertext string.

11. The method of claim 9 wherein said collection of arbitrary integer parameters includes a plurality of length parameters defining a plurality of subsequences of said plaintext string each having a length equal to one of said plurality of length parameters wherein said computation means is operable on each of said plurality of subsequences of said plaintext string to generate said cyphertext string.

12. The method of claim 9 wherein the number of operations performed by said first computation means is proportional to the size of said plaintext string.

13. The method of claim 9 wherein the number of operations performed by said second computation means is proportional to the size of said plaintext string.

14. The method of claim 9 wherein the number of operations performed by said first computation means is equal to the number of operations performed by said second computation means.

15. A system for encrypting a plaintext string of digital data comprising:

means for generating a cyphertext string corresponding to said plaintext string by iteratively applying a reversible, nonlinear, discrete partial difference equation in accordance with a key comprised of a finite collection of arbitrary integer parameters wherein said reversible, nonlinear, discrete partial difference equation is a nonlinear feedback shift register; and means for transmitting said cyphertext string to a second system.

16. The system of claim 15 wherein said collection of arbitrary integer parameters includes a length parameter defining a plurality of subsequences of said plaintext string each having a length equal to said length parameter wherein said computation means is operable on each of said plurality of subsequences of said plaintext string to generate said cyphertext string.

17. The system of claim 15 wherein said collection of arbitrary integer parameters includes a plurality of length parameters defining a plurality of subsequences of said plaintext string each having a length equal to one of said plurality of length parameters wherein said computation means is operable on each of said plurality of subsequences of said plaintext string to generate said cyphertext string.

18. A system for decrypting a cyphertext string of digital data comprising:

means for generating a plaintext string corresponding to said cyphertext string by iteratively applying a reversible, nonlinear, discrete partial difference equation in accordance with a key comprised of a finite collection of arbitrary integer parameters wherein said reversible, nonlinear, discrete partial difference equation is a nonlinear feedback shift register; and means for transmitting said plaintext string to a second system.

19. The system of claim 18 wherein said collection of arbitrary integer parameters includes a length parameter defining a plurality of subsequences of said cyphertext string each having a length equal to said length parameter wherein said computation means is operable on each of said plurality of subsequences of said cyphertext string to generate said plaintext string.

20. The system of claim 18 wherein said collection of arbitrary integer parameters includes a plurality of length parameters defining a plurality of subsequences of said cyphertext string each having a length equal to one of said plurality of length parameters wherein said computation means is operable on each of said plurality of subsequences of said cyphertext string to generate said plaintext string.

21. A system for encrypting and decrypting a plaintext string of digital data comprising:

means, in a first device of said system, for generating a cyphertext string corresponding to said plaintext string by iteratively applying a reversible, nonlinear, discrete partial difference equation in accordance with a key comprised of a finite collection of arbitrary integer parameters;

means for transmitting said plaintext string to a second device of said system; and means, in said second device of said system, for re-generating a plaintext string corresponding to said cyphertext string by iteratively applying said reversible, nonlinear, discrete partial difference equation in accordance with a key comprised of said finite collection of arbitrary integer parameters, wherein said reversible, nonlinear, discrete partial difference equation is a nonlinear feedback shift register.

22. The system of claim 21 wherein said collection of arbitrary integer parameters includes a length parameter defining a plurality of subsequences of said plaintext string each having a length equal to said length parameter wherein said means in said first device is operable on each of said plurality of subsequences of said plaintext string to generate said cyphertext string and wherein said length parameter defines a plurality of subsequences of said cyphertext string each having a length equal to said length parameter wherein said means in said second device is operable on each of said plurality of subsequences of said cyphertext string to generate said plaintext string.

23. The system of claim 21 wherein said collection of arbitrary integer parameters includes a plurality of length parameters defining a plurality of subsequences of said plaintext string each having a length equal to one of said plurality of length parameters wherein said means in said second device is operable on each of said plurality of subsequences of said plaintext string to generate said cyphertext string and wherein said length parameters define a plurality of subsequences of said cyphertext string each having a length equal to one of said plurality of length parameters wherein said means in said second is operable on each of said plurality subsequences of said cyphertext string to generate said plaintext string.

* * * * *